United States Patent
Miyamoto et al.

(10) Patent No.: US 10,420,011 B2
(45) Date of Patent: Sep. 17, 2019

(54) COMMUNICATION SYSTEM, TRANSMISSION TERMINAL, COMMUNICATION METHOD, AND MEDIUM

(71) Applicant: Ricoh Company, Ltd., Tokyo (JP)

(72) Inventors: Atsushi Miyamoto, Kanagawa (JP); Takahiro Asai, Kanagawa (JP); Takeshi Horiuchi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 224 days.

(21) Appl. No.: 15/063,740

(22) Filed: Mar. 8, 2016

(65) Prior Publication Data
US 2016/0269973 A1 Sep. 15, 2016

(30) Foreign Application Priority Data

Mar. 12, 2015 (JP) ................................ 2015-049285

(51) Int. Cl.
- *H04W 40/24* (2009.01)
- *H04W 4/80* (2018.01)
- *H04L 29/06* (2006.01)

(52) U.S. Cl.
CPC ....... *H04W 40/246* (2013.01); *H04L 65/1096* (2013.01); *H04L 65/403* (2013.01); *H04L 65/4015* (2013.01); *H04W 4/80* (2018.02)

(58) Field of Classification Search
CPC ........... H04W 40/246; H04W 65/1096; H04W 65/4015; H04W 65/403
See application file for complete search history.

(56) References Cited

U.S. PATENT DOCUMENTS 7,624,417 B2 11/2009 Dua
8,885,008 B2 11/2014 Okita et al.
(Continued)

FOREIGN PATENT DOCUMENTS

EP 2 772 847 A2 9/2014
JP 2003-273898 A 9/2003
(Continued)

OTHER PUBLICATIONS

Office Action dated May 11, 2017 in European Patent Application No. 16159383.5.
(Continued)

*Primary Examiner* — Alex Skripnikov
*Assistant Examiner* — Pamit Kaur
(74) *Attorney, Agent, or Firm* — Xsensus LLP

(57) ABSTRACT

A communication system includes a first device at a first site and a second device at a second site communicating with each other. The first device includes a communication start unit to start communication with the second device, a connection information obtainment unit to obtain connection information from another device at the first site connected with the first device by wire or wirelessly, for another device at the second site to connect with the other device at the first site, and a transmitter unit to transmit the connection information to the second device. The second device includes a receiver unit to receive the connection information from the first device, and another device communication unit to transmit the connection information received by the receiver unit, to the other device at the second site connected with the second device by wire or wirelessly.

13 Claims, 17 Drawing Sheets

(56) References Cited

U.S. PATENT DOCUMENTS

| | | | |
|---|---|---|---|
| 2004/0117446 A1* | 6/2004 | Swanson | G06Q 10/1095 |
| | | | 709/205 |
| 2005/0041603 A1* | 2/2005 | Tighe | H04L 12/1822 |
| | | | 370/260 |
| 2011/0161505 A1 | 6/2011 | Siegel et al. | |
| 2012/0002003 A1* | 1/2012 | Okita | H04L 12/1827 |
| | | | 348/14.11 |
| 2013/0050397 A1 | 2/2013 | Maeng et al. | |
| 2015/0077369 A1 | 3/2015 | Nagahara et al. | |
| 2015/0264311 A1 | 9/2015 | Hinohara et al. | |
| 2016/0050280 A1* | 2/2016 | Ong | H04L 67/141 |
| | | | 709/201 |

FOREIGN PATENT DOCUMENTS

| | | |
|---|---|---|
| JP | 2003-528543 A | 9/2003 |
| JP | 2007-282219 A | 10/2007 |
| JP | 2010-087704 | 4/2010 |
| JP | 2012-075073 | 4/2012 |
| JP | 2013-78105 A | 4/2013 |
| JP | 2015-084211 | 4/2015 |
| JP | 2015-177463 | 10/2015 |
| WO | WO 2005/019988 A2 | 3/2005 |
| WO | WO 2010/073563 A1 | 7/2010 |

OTHER PUBLICATIONS

Extended European Search Report dated Aug. 8, 2016 in European Patent Application No. 16159383.5.
Japanese Office Action dated Jan. 22, 2019 in Japanese Patent Application No. 2015-049285, 3 pages.

* cited by examiner

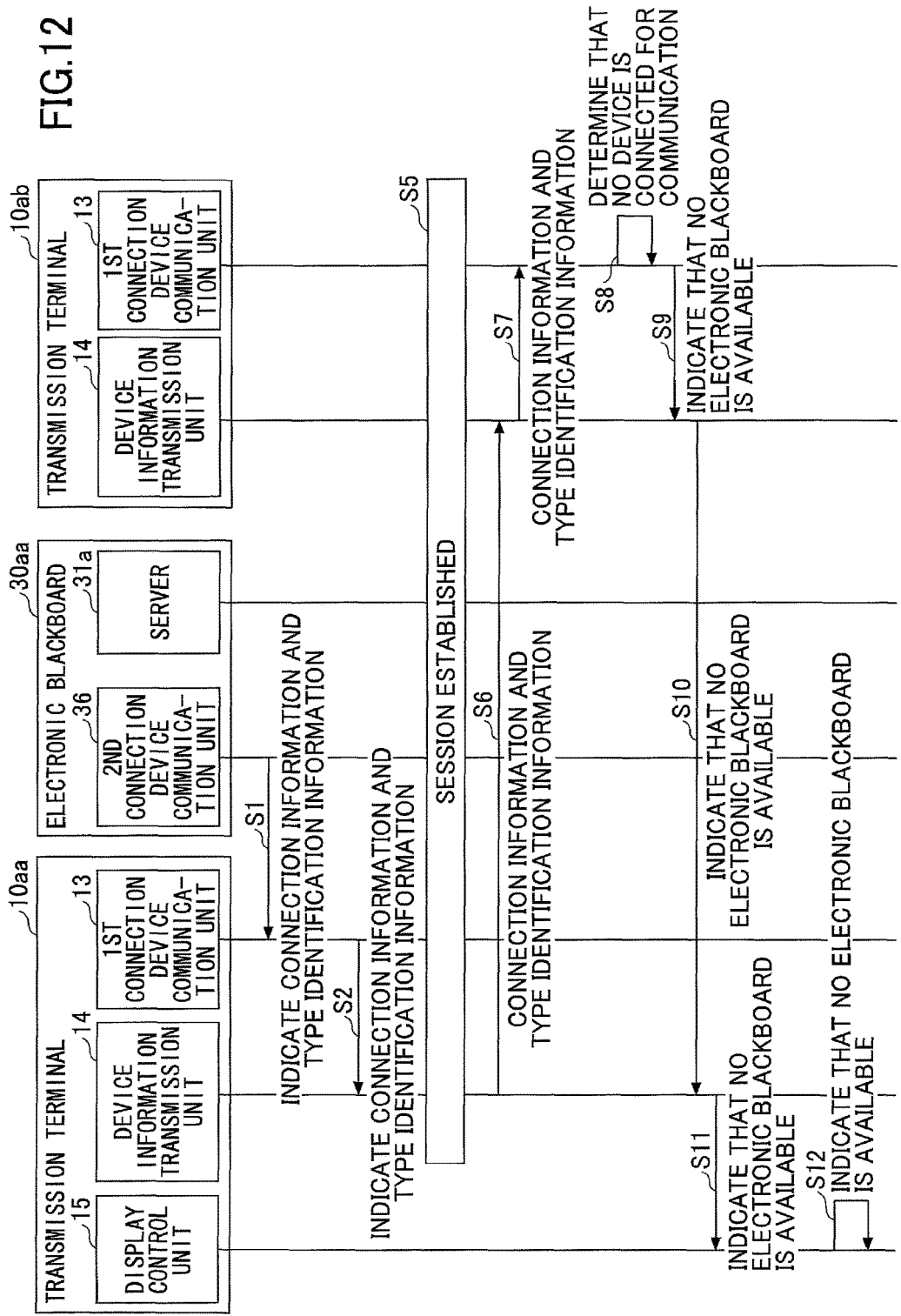

COMMUNICATION SYSTEM, TRANSMISSION TERMINAL, COMMUNICATION METHOD, AND MEDIUM

BACKGROUND OF THE INVENTION

1. Field of the Invention

The following disclosure generally relates to a communication system, a transmission terminal, a communication method, and a medium.

2. Description of the Related Art

As the infrastructure of network environments improves, devices communicating via networks are used more widely. For example, in a video-conference system, transmission devices that are placed at respective remote locations can execute a remote conference via a communication network such as the Internet. Also, there is a system in which devices called electronic blackboards, which are placed at different sites, communicate via a network to transmit display contents on displays of the electronic blackboards with each other, and to share the display contents (conveniently, referred to as the "electronic blackboard system" below).

Moreover, if users use such distinctive systems at the same time, it is expected that higher-level communication can be made among the users at remote locations.

Incidentally, it is often the case that devices for communication via networks need to be authenticated by a server or a partner device to secure the safety of the communication. However, the authentication needs to be done for each system. Therefore, a user who uses a video-conference system and an electronic blackboard system needs to have his/her device authenticated separately for each of the systems. Therefore, if the user uses the video-conference system while using the electronic blackboard system, the user needs to do authentication operations twice, which incurs a load on the user.

A technology to reduce such an operational load has been devised (see, for example, Japanese Laid-open Patent Publication No. 2010-87704). The Patent Publication discloses a server that, while multiple communication terminals communicate by a first communication unit, if the server receives a communication request from a first communication terminal to a second communication terminal by a second communication unit, obtains connection information of the second communication terminal in the first communication unit; obtains connection information of the second communication terminal in the second communication unit that corresponds to the connection information of the second communication terminal in the first communication unit; and executes communication between the first communication terminal and the second communication terminal by the second communication unit.

However, the technology described in the Patent Publication has a problem that the user needs to store in advance connection information for each communication unit of a communication terminal in a database on the server before starting the communication.

In view of the above, it is a general object of at least one embodiment to provide a communication system that can reduce the user's load when starting communication between devices via a network.

SUMMARY OF THE INVENTION

According to an embodiment, a communication system includes a first device at a first site and a second device at a second site communicating with each other. The first device includes a communication start unit configured to start communication with the second device, a connection information obtainment unit configured to obtain connection information from another device at the first site connected with the first device by wire or wirelessly, for another device at the second site to connect with the other device at the first site, and a transmitter unit configured to transmit the connection information to the second device. The second device includes a receiver unit configured to receive the connection information from the first device, and another device communication unit configured to transmit the connection information received by the receiver unit, to the other device at the second site connected with the second device by wire or wirelessly.

Thus, a communication system can be provided that can reduce the user's load when starting communication between devices via a network.

BRIEF DESCRIPTION OF DRAWINGS

FIG. 12 is an example of a sequence chart that illustrates steps to have an electronic blackboard 30ab authenticated by an electronic blackboard 30aa by using a first communication system S1;

DETAILED DESCRIPTION OF THE PREFERRED EMBODIMENTS

In the following, embodiments will be described with reference to the drawings.

First Embodiment

Figure 1A:
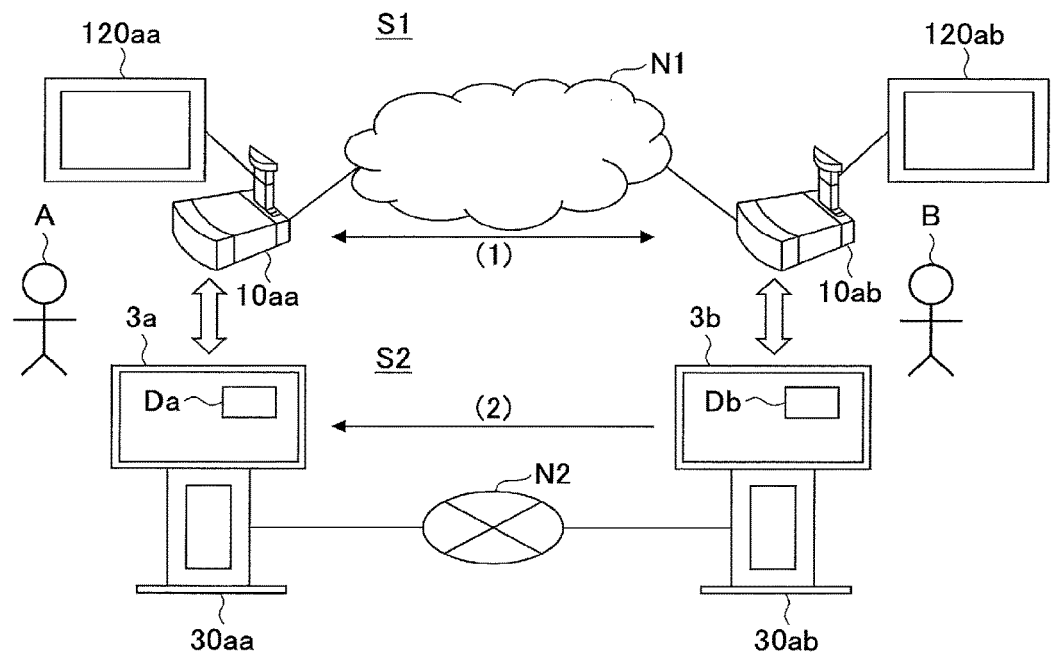
FIGS. 1A-1B are diagrams that illustrate authentication steps of a first communication system S1 and a second communication system S2.

An overview of authentication steps in a first embodiment will be described using FIG. 1. FIG. 1A is a diagram that illustrates conventional authentication steps of a first communication system S1 and a second communication system S2, which are provided for comparison. A system in which transmission terminals 10aa and 10ab communicate via a first communication network N1, will be referred to as a first communication system S1, and a system in which an electronic blackboard 30aa (another device in a first site) and an electronic blackboard 30ab (another device in a second site) communicate via a second communication network N2, will be referred to as a second communication system S2.

As illustrated in FIG. 1A, the transmission terminal 10aa and the electronic blackboard 30aa are placed at the same site (referred to as a site A below), and the transmission terminal 10ab and the electronic blackboard 30ab are placed at the same site (referred to as a site B below). The transmission terminal 10aa and the electronic blackboard 30aa can communicate by wire or wirelessly, and the electronic blackboard 30aa can display a screen that the transmission terminal 10aa displays on a display 120aa, in an area Da on a display 3a. It is virtually the same for the transmission terminal 10ab and the electronic blackboard 30ab.

Also, the transmission terminals 10aa and 10ab can communicate via the first communication network N1, and the electronic blackboards 30aa and 30ab can communication via the second communication network N2. A user A at the site A draws characters and figures on the electronic blackboard 30aa during a video conference with a user B at the site B by using the transmission terminals 10aa and 10ab. The electronic blackboard 30ab communicates with the electronic blackboard 30aa, and displays the characters and figures drawn on the electronic blackboard 30a, on the display 3b. Thus, the user A and the user B can share the contents drawn on the electronic blackboards 30 during the video-conference.

Under such a configuration, conventionally, the following steps are required for the user A, who uses the transmission terminal 10aa and the electronic blackboard 30aa, to start a video-conference with the user B, who uses the transmission terminal 10ab and the electronic blackboard 30ab.

(1) The user A operates the transmission terminal 10aa to establish a session (communication) with the transmission terminal 10ab. During the course, the transmission terminals 10aa and 10ab are authenticated.

(2) The user A informs the user B of the IP address and the passcode of the electronic blackboard 30aa by an available method such as telephone, and the user B inputs them into the electronic blackboard 30ab, to have the electronic blackboard 30ab authenticated by the electronic blackboard 30aa, and then, communication starts.

Therefore, to have a conference with the user B by using the transmission terminal 10aa and the electronic blackboard 30aa, the user A needs to do separately an operation to connect the transmission terminals 10aa with 10ab, and an operation to connect the electronic blackboards 30aa with 30ab.

Figure 1B:
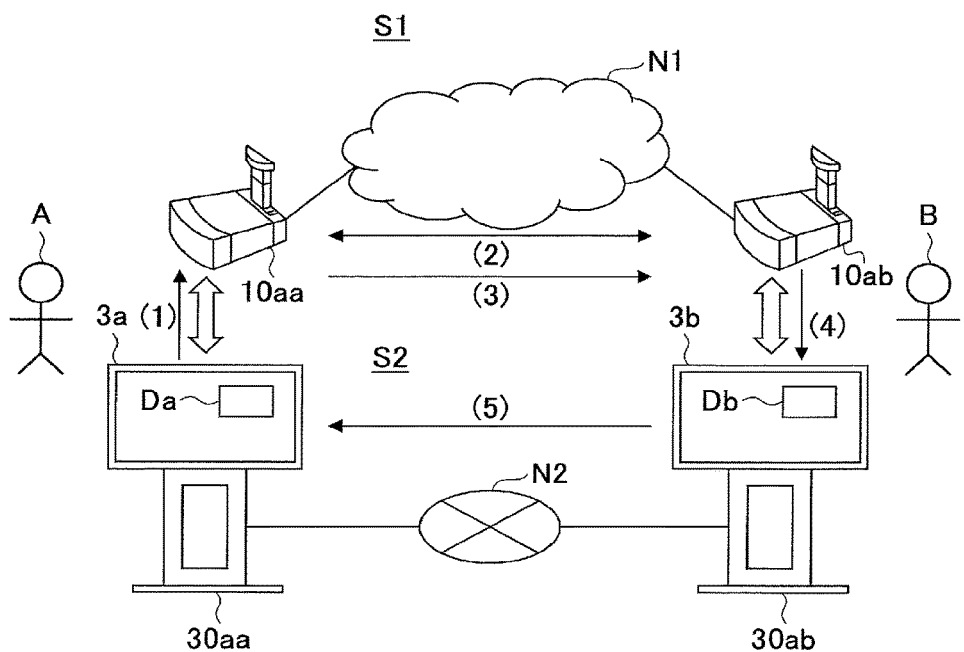

Next, using FIG. 1B, steps of authentication of the embodiment will be described. FIG. 1B is a diagram that illustrates authentication steps of the first communication system S1 and the second communication system S2 in the embodiment.

(1) The electronic blackboard 30aa having detected that the transmission terminal 10aa is connected transmits the IP address and the passcode of itself to the transmission terminal 10aa.

(2) The user A operates the transmission terminal 10aa to establish a session (communication) with the transmission terminal 10ab. During this course, the transmission terminals 10aa and 10ab are authenticated.

(3) The transmission terminal 10aa transmits the IP address and the passcode of the electronic blackboard 30aa to the transmission terminal 10ab.

(4) The transmission terminal 10ab transmits the IP address and the passcode of the electronic blackboard 30aa to the electronic blackboard 30ab.

(5) By using the IP address and the passcode of the electronic blackboard 30aa, the electronic blackboard 30ab is authenticated by the electronic blackboard 30aa, and then, communication starts with the electronic blackboard 30ab.

The IP address and the passcode of the electronic blackboard 30aa have been transmitted from the transmission terminal 10aa authenticated by the first communication system S1, to the transmission terminal 10ab. Therefore, they have been verified to be the IP address and the passcode of the electronic blackboard 30aa being used by the user A. The transmission terminal 10ab has also been authenticated by the first communication system S1. Therefore, the electronic blackboard 30ab connected with the transmission terminal 10ab has been verified to be that being used by the user B.

Therefore, the second communication system S2 in the embodiment can authenticate the electronic blackboards 30aa and 30ab by using the transmission terminals 10aa and 10ab that have been authenticated by the first communication system S1. In other words, without using a database in which the transmission terminal 10aa is associated with the electronic blackboard 30aa in advance, a user can complete authentication in the first communication system S1 and the second communication system S2, by just performing an operation required once for authentication. Also, the operational load of the user can be reduced.

<Configuration Example of First Communication System S1>

Figure 2:
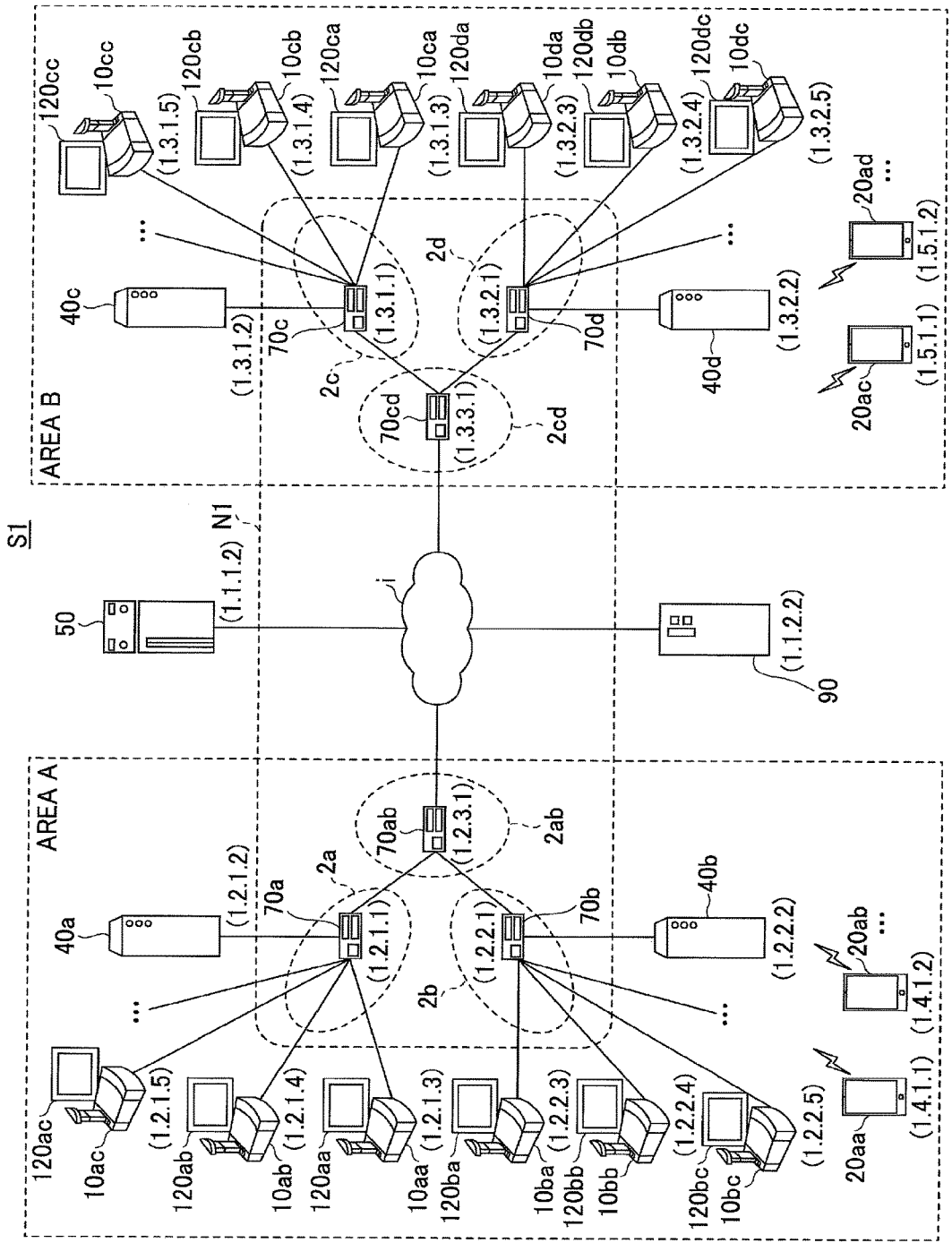
FIG. 2 is a basic view of an example of a first communication system S1.

FIG. 2 is a basic view of an example of the first communication system S1. The first communication system S1 is a communication system that transfers information, emotions, and the like among multiple transmission terminals via a transmission management system 50. Examples of the first communication system S1 include a video-conference system, a TV telephone system, an audio conference system, an audio phone call system, a PC (Personal Computer) display sharing system, and a text chat system. Also, the first communication system S1 includes a data providing system that unidirectionally transmits contents data from a transmission terminal to another transmission terminal via the transmission management system 50.

In the following description of the embodiment, the first communication system S1 is assumed to be a video-conference system as an example of a communication system.

The first communication system S1 illustrated in FIG. 2 is constituted with multiple transmission terminals 10aa, 10ab, etc., displays 120aa, 120ab, etc., for the transmission terminals 10aa, 10ab, etc., multiple relay devices 40a, 40b, etc., the transmission management system 50, and a program providing system 90.

The transmission terminals 10 transmit and receive image and audio data as contents data. In other words, the transmission terminals 10 are video-conference terminals that can use video-conference services. In the embodiment, the transmission terminals 10 are assumed to be terminals dedicated for the video-conference.

The mobile terminals 20 transmit and receive image and audio data as contents data. The mobile terminals 20 may be capable of transmitting and receiving text data. In other words, the mobile terminals 20 may be capable of using text chat in addition to the video-conference. In the embodiment, unless otherwise specified, the mobile terminal 20 may be a tablet-type terminal, a cellular phone, a smart phone, a PDA (Personal Digital Assistant), a wearable computer, a monitor camera, an electronic blackboard, a game device, a general-purpose PC terminal, a car navigation terminal, a projection device such as a projector, an industrial device having communication functions, or the like. Wearable computers include a wrist watch and a head-mounted display. Also, industrial devices include office devices such as an MFP (Multifunctional Peripheral/Printer/Product), medical devices such as endoscopes, and industrial devices such as cultivators.

Note that the mobile terminals 20 are wirelessly connected with the first communication network N1, for example, via a cellular phone communication network or WiFi (Wireless Fidelity).

The transmission terminals 10 and the mobile terminals 20 may be referred to as information processing apparatuses, as clarified by a hardware configuration described later.

The transmission terminals 10 and the mobile terminals 20 are managed by the transmission management system 50 that manages call control of the communication system.

Note that in the following, a "transmission terminal 10" represents an arbitrary transmission terminal among the transmission terminals 10aa, 10ab, etc., and a "mobile terminal 20" represents an arbitrary mobile terminal among the mobile terminals 20aa, 20ab, etc. It is the same for the displays 120, the relay devices 40, and routers 70.

Also, a terminal that is a transmission terminal 10 or a mobile terminal 20, and requests another transmission terminal 10 or another mobile terminal 20 to start a video-conference, will be referred to as a "requesting terminal", and a terminal that is the destination of the request will be referred to as a "destination terminal".

Also, in the first communication system S1, a session for management information is established between a requesting terminal and a destination terminal, to transmit and receive various management information items via the transmission management system 50. Also, a session for transmitting and receiving contents data is established between the requesting terminal and the destination terminal via the relay device 40. Note that the session for contents data does not need to be intervened by the relay device 40, but the session may be established via the transmission management system 50, or the session may be directly established between the requesting terminal and the destination terminal.

The relay device 40 relays contents data among the transmission terminals 10 and the mobile terminals 20 as described above.

The transmission management system 50 executes login authentication of the transmission terminals 10 and the mobile terminals 20, manages phone call states, manages an address list, indicates a transmission destination of contents data to the relay device 40, and has the relay device 40 manage the phone call states.

The program providing system 90 stores in an HD (Hard Disk) 304, which will be described later, a program for a terminal to implement various functions on the transmission terminals 10 and the mobile terminals 20, which can be transmitted to the transmission terminals 10 and the mobile terminals 20. The HD 304 in the program providing system 90 also stores a program for transmission control 320 to implement various functions on the management system 50, which can be transmitted to the management system 50.

The transmission terminals 10aa, 10ab, 10ac, etc., the relay device 40a, and the router 70a are connected by a LAN 2a for communication. The transmission terminals 10ba, 10bb, 10bc, etc., the mobile terminals 20aa, 20ab, etc., the relay device 40b, and the router 70b are connected by a LAN 2b for communication. Also, the LAN 2a and LAN 2b are connected by a dedicated line 2ab including the router 70ab for communication, and are set up in a predetermined region A. The region A is, for example, Japan, the LAN 2a may set up in an office in Tokyo, and the LAN 2b may set up in an office in Osaka. Also, the mobile terminals 20aa, 20ab, etc., are used in the region A.

The transmission terminals 10ca, 10cb, 10cc, etc., the relay device 40c, and the router 70c are connected by a LAN 2c for communication. The transmission terminals 10da, 10db, 10dc, etc., the mobile terminals 20ac, 20ad, etc., the relay device 40d, and the router 70d are connected by a LAN 2d for communication. Also, the LAN 2c and LAN 2d are connected by a dedicated line 2cd including the router 70cd for communication, and are set up in a predetermined region B. The region B is, for example, U.S.A, the LAN 2c may set up in an office in New York, and the LAN 2d may set up in an office in Washington D.C. Also, the mobile terminals 20ac, 20ad, etc., are used in the region B.

Also, the transmission management system 50 and the program providing system 90 are connected with the transmission terminals 10, the mobile terminals 20, and the relay devices 40 via the Internet i for communication. The transmission management system 50 or the program providing system 90 may be installed in the region A or the region B, or may be installed in any other region. The first communication network N1 is realized by the LANs 2a, 2b, 2ab, 2c, 2d, 2cd, and the Internet i.

Also, in FIG. 2, sets of four numerals attached below each of the transmission terminals 10, the mobile terminals 20, the relay devices 40, the transmission management system 50, the routers 70, and the program providing system 90, represent respective IP addresses in the IPv4 format in a simplified way.

<Hardware Configuration>

<<Transmission Terminal>>

Figure 3:
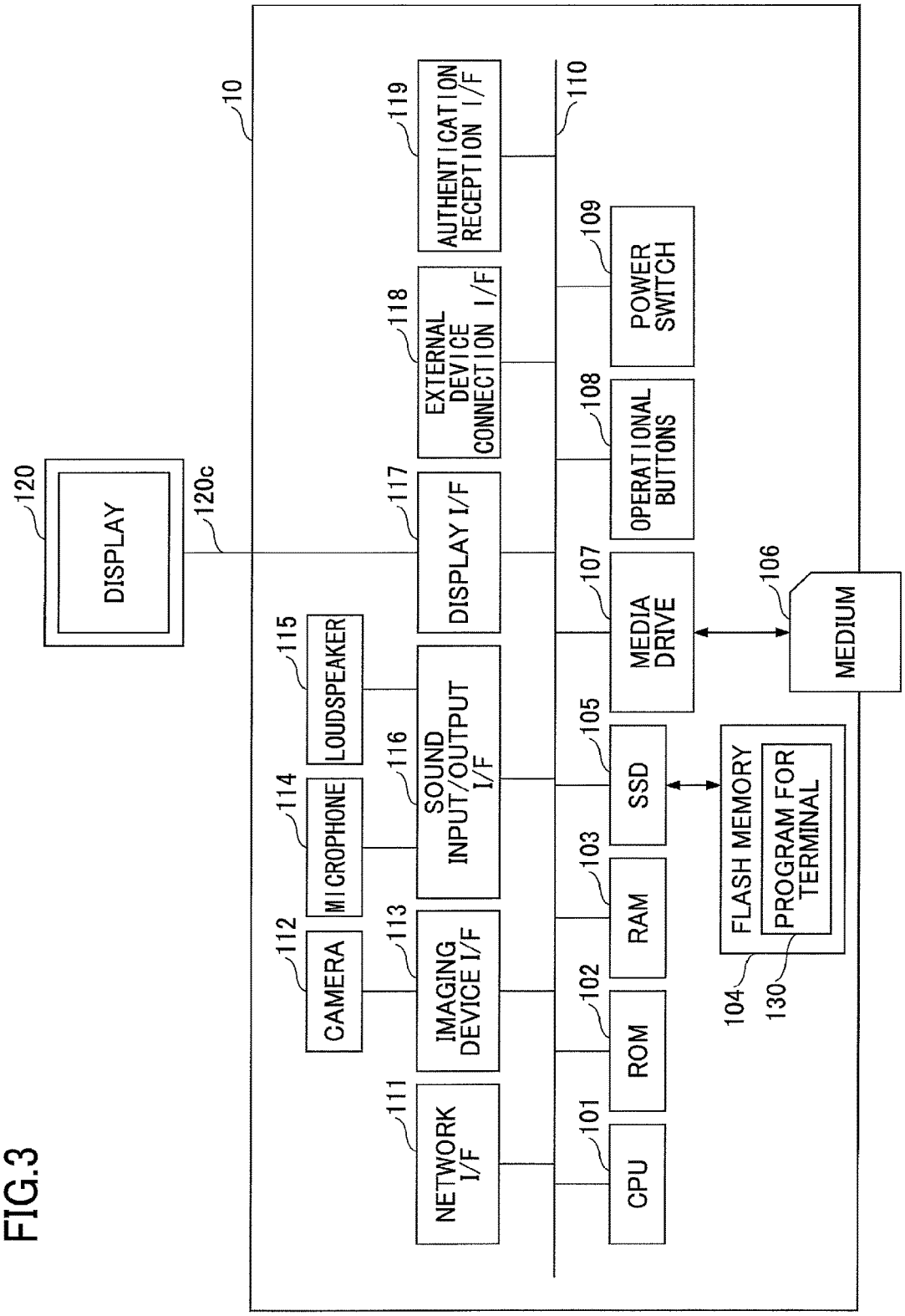
FIG. 3 is an example of a hardware configuration diagram of a transmission terminal.

Next, using FIG. 3, a hardware configuration of the transmission terminal 10 will be described. FIG. 3 is an example of a hardware configuration diagram of the transmission terminal 10 according to the embodiment. As illustrated in FIG. 3, the transmission terminal 10 in the embodiment includes a CPU (Central Processing Unit) 101 to control the overall behavior of the transmission terminal 10; a ROM (Read-Only Memory) 102 that stores a program to be used for driving the CPU 101, such as an IPL (Initial Program Loader); a RAM (Random Access Memory) 103 used as a work area for the CPU 101; a flash memory 104 to store the program for a terminal 130 and various data such as image data, audio data, and the like; an SSD (Solid State Drive) 105 to write/read various data to/from the flash memory 104 under the control of the CPU 101; a media drive 107 to control writes/reads of the data to/from a recording medium 106 such as a flash memory; operation buttons 108 to be operated when selecting an address of a destination of a transmission terminal 10; a power switch 109 to switch on and off the power of the transmission terminal 10, and a network interface 111 to transmit data using the first communication network N1.

Also, the transmission terminal 10 includes a built-in camera 112 to obtain image data by taking a picture of an object under the control of the CPU 101; an imaging device interface 113 to control driving the camera 112; a built-in microphone 114 to input sounds; a built-in loudspeaker 115 to output sounds; a sound input/output interface 116 to input/output audio signals between the microphone 114 and the speaker 115 under the control of the CPU 101; a display interface 117 to transmit image data to the external display 120 under the control of the CPU 101; an external device connection interface 118 to connect various external devices; an authentication reception I/F 119; and a bus line 110 including an address bus, a data bus, and the like to electrically connect the above elements as illustrated in FIG. 3.

The display 120 is a unit for displaying image data of an object, operational icons, and the like, on a screen constituted with an LCD or an organic EL display. The display 120 is connected to the display interface 117 by a cable 120c. Although the display 120 of the transmission terminal 10 is connected to the display interface 117 by the cable 120c, it is not limited to that. The display 120 may be built in the transmission terminal 10.

The external device connection interface 118 may be connected with an external camera, an external microphone, an external loudspeaker, and the like, with a USB (Universal Serial Bus) cable or the like.

The authentication reception I/F 119 is an interface to receive input of authentication information from a user, and specifically corresponds to an IC card reader (for example, an NFC (Near field communication) device), or a reader unit of an SD card or a SIM card.

Further, the program for a terminal 130 may be recorded on computer-readable recording media such as the recording medium 106 to be distributable, in a format which is installable or executable on a computer. Also, the program for a terminal 130 may be stored in the ROM 102, instead of the flash memory 104.

A hardware configuration of the mobile terminal 20 may include virtually the same parts as those in the hardware configuration of the transmission terminal 10, and even if there are differences, they may induce no problem to implement the embodiment.

<<Transmission Management System, Relay Device, and Program Providing System>>

Figure 4:
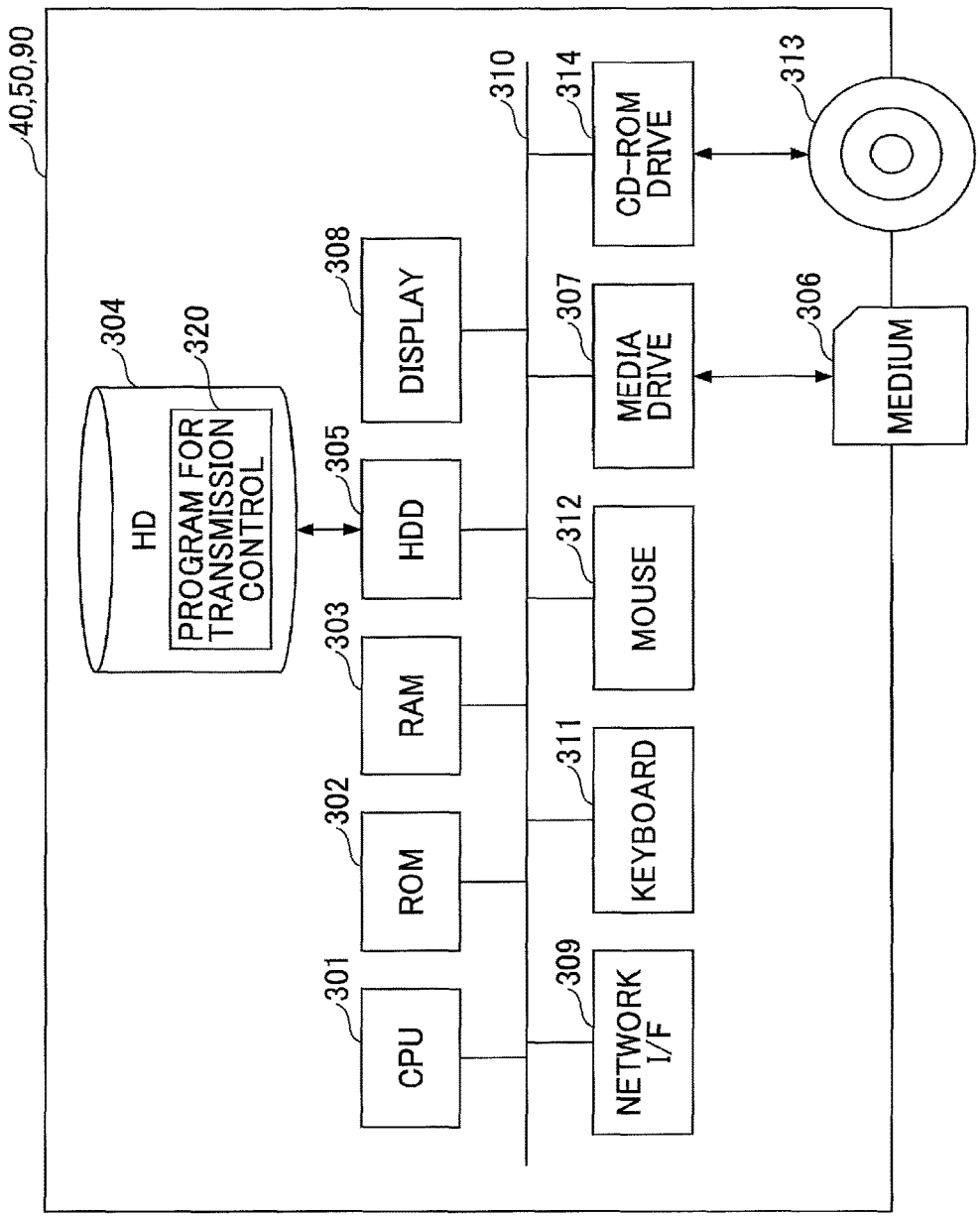
FIG. 4 is an example of a hardware configuration diagram of a transmission management system.

Next, using FIG. 4, a hardware configuration of the transmission management system 50 will be described. FIG. 4 is an example of a hardware configuration diagram of the transmission management system 50 according to the embodiment.

Note that the hardware configuration of the transmission management system 50 or the like in the figure illustrates hardware elements that are preferably provided by the transmission management system 50 or the like, and the elements do not need to be installed in a single housing or provided as an integrated device. Also, to be usable in a cloud computing environment, the physical configuration of the transmission management system 50 or the like in the embodiment does not need to be fixed, but may be configured to have the hardware resources connected or cut off dynamically depending on load.

The transmission management system 50 includes a CPU 301 to control the overall behavior of the transmission management system 50; a ROM 302 to store programs to be used for driving the CPU 101, such as an IPL (Initial Program Loader); a RAM 303 used as a work area for the CPU 301; an HD 304 to store various data of the program for transmission control 320; an HDD (hard disk drive) 305 to write/read various data to/from the HD 304 under the control of the CPU 301; a media drive 307 to control writes/reads of the data to/from recording medium 306 such as a flash memory; a display 308 to display various information items such as cursors, menus, windows, characters, and images; a network interface 309 to transmit data by using the first communication network N1; a keyboard 311 providing multiple keys to enter characters, numerals, various commands, etc.; a mouse 312 for various selections and executions, selection of an object, and moving the cursor; a CD-ROM drive 314 to control a CD-ROM (Compact Disc Read Only Memory) 313, which is an example of the recording media attached/detached easily; and a bus line 310 including an address bus, a data bus, and the like to electrically connect the above elements illustrated in FIG. 4.

Note that the program for transmission control 320 may be recorded on computer-readable recording media such as the recording medium 306, the CD-ROM 313, etc., to be distributable, in a format which is installable or executable on a computer. Also, the program for transmission control 320 may be stored in the ROM 302 instead of the HD 304.

Also, the relay device 40 and the program providing system 90 have substantially the same hardware configuration as that of the transmission management system 50, and the description is omitted.

<Configuration Example of Second Communication System S2>

Figure 5:
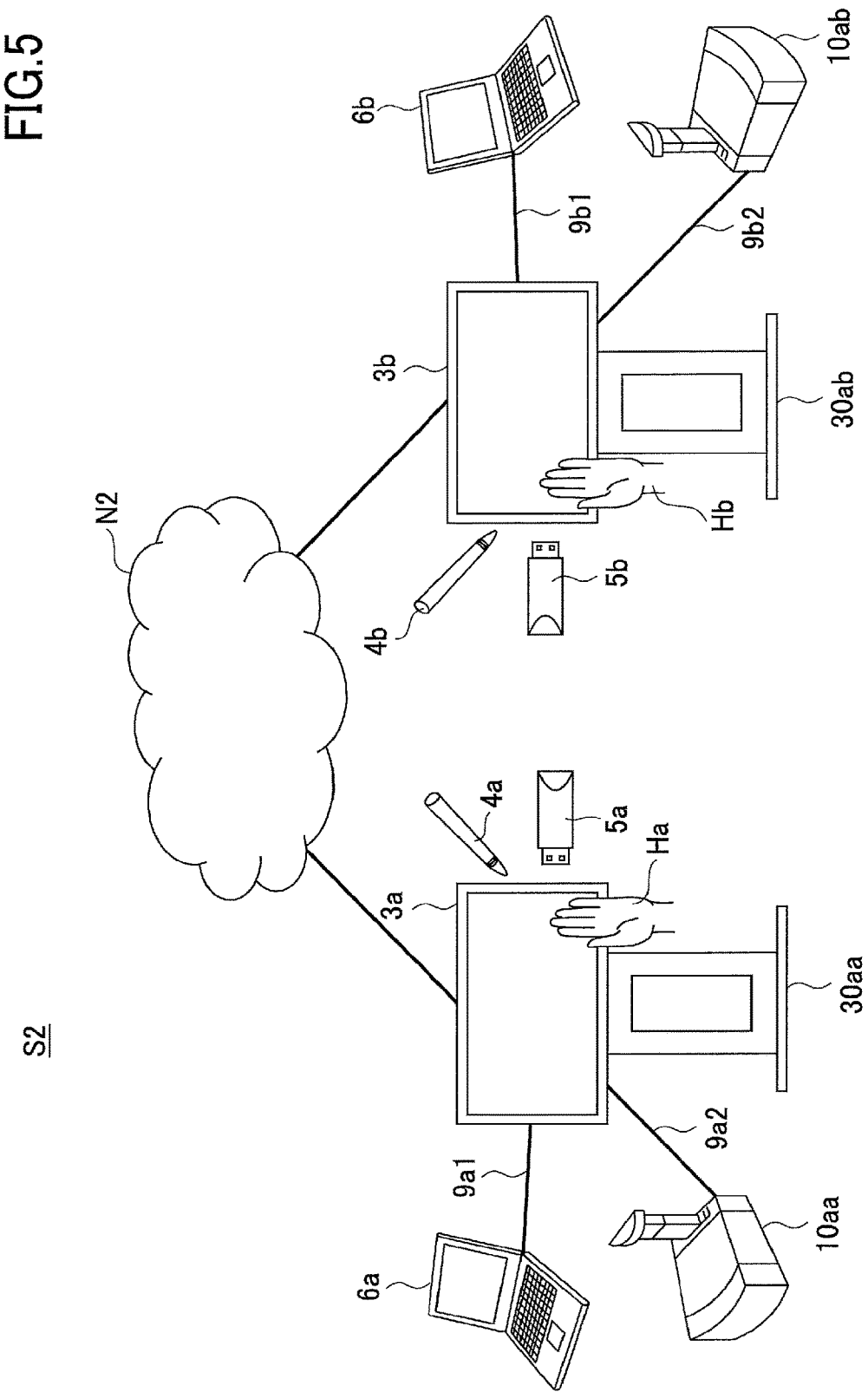
FIG. 5 is an example of an overall configuration diagram of a second communication system S2.

FIG. 5 is an example of an overall configuration diagram of a second communication system S2. Note that in FIG. 5, just two units of the electronic blackboards 30aa and 30ab, accompanying electronic pens 4a, and 4b and the like are illustrated to simplify the description. However, three or more two units of the electronic blackboards 30, the electronic pens and the like may be used.

The second communication system S2 includes the electronic blackboards 30aa and 30ab, the electronic pens 4a and 4b, USB memories 5a and 5b, note PCs (Personal Computers) 6a and 6b, and the transmission terminals 10aa and 10ab. Also, the electronic blackboards 30aa and 30ab are connected via the second communication network N2 for communication. Furthermore, the electronic blackboards 30aa and 30ab are provided with the displays 3a and 3b, respectively.

Also, the electronic blackboard 30aa can have the display 3a display an image drawn by events generated by the electronic pen 4a (touches on the display 3a by the pen point of the electronic pen 4a or the pen tail of the electronic pen 4a). Note that the image displayed on the display 3a can be changed based on events generated by not only the electronic pen 4a but also a user's hand H or the like (gestures for magnification, reduction, page turning, and the like).

Also, the USB memory 5a can be connected with the electronic blackboard 30aa so that the electronic blackboard 30aa can read electronic files such as a PDF from the USB memory 5a, and the electronic blackboard 30aa can record electronic files in the USB memory 5a. Also, the note PC 6a is connected with the electronic blackboard 30aa via a cable 9a1 that is capable of communication by standards such as Display Port, DVI (Digital Visual Interface), HDMI (trademark) (High-Definition Multimedia Interface), VGA (Video Graphics Array), etc. Then, when an event is generated by a contact on the display 3a, the electronic blackboard 30aa transmits event information representing the event to the note PC 6a in the same way as done for events on input units such as a mouse and a keyboard. Similarly, the transmission terminal 10aa is connected with the electronic blackboard 30aa via a cable 9a2 that is capable of communication by the standards. Note that the note PC 6a and the transmission terminal 10aa may communicate with the electronic blackboard 30aa by wireless communication compliant with various wireless communication protocols such as Bluetooth (trademark).

At another site where the electronic blackboard 30ab is installed, the electronic blackboard 30ab having the display 3b, the electronic pen 4b, the USB memory 5b, the note PC 6b, the transmission terminal 10ab, a cable 9b1, and a cable 9b2 are used similarly as above. In addition, an image displayed on the display 3b can be changed based on events generated by a user's hand Hb or the like.

Thus, an image drawn on the display 3a of the electronic blackboard 30aa at the one site is displayed on the display 3b of the electronic blackboard 30ab at the other site. Conversely, an image drawn on the display 3b of the electronic blackboard 30ab at the other site is displayed on the display 3a of the electronic blackboard 30aa at the one site.

Note that in the following, an arbitrary one of the electronic blackboards will be referred to as an "electronic blackboard 30". It is the same for the display 3, the electronic pen 4, the USB memory 5, the note PC 6, the hand H, and the cable 9.

The second communication network N2 is assumed to be a so-called "intranet". An intranet is an in-house network separated from the outside by a fire wall or the like, to which one or more LANs are connected via routers. The second communication network N2 may be a WAN having multiple LANs connected as long as it is an in-house network. The electronic blackboard 30aa can communicate with the electronic blackboard 30ab if the IP address is available because it is an in-house network. On the other hand, if the electronic blackboard 30aa is connected with an outside network, or the communication goes out to the outside once even if the electronic blackboard 30aa is in the inside, it is not possible to communicate with the electronic blackboard 30ab unless the communication goes through a server.

Also, the electronic blackboard 30 in the embodiment does not need to be a device that only has functions of an electronic blackboard, but may be a smart phone, a cellular phone, a car navigation terminal, a wearable computer, a monitor camera, a game device, and an industrial device having communication functions. Wearable computers include a wrist watch and a head-mounted display. Also, industrial devices include office devices such as an MFP (Multifunctional Peripheral/Printer/Product), medical devices such as endoscopes, and industrial devices such as cultivators.

<Hardware Configuration of Electronic Blackboard>

Figure 6:
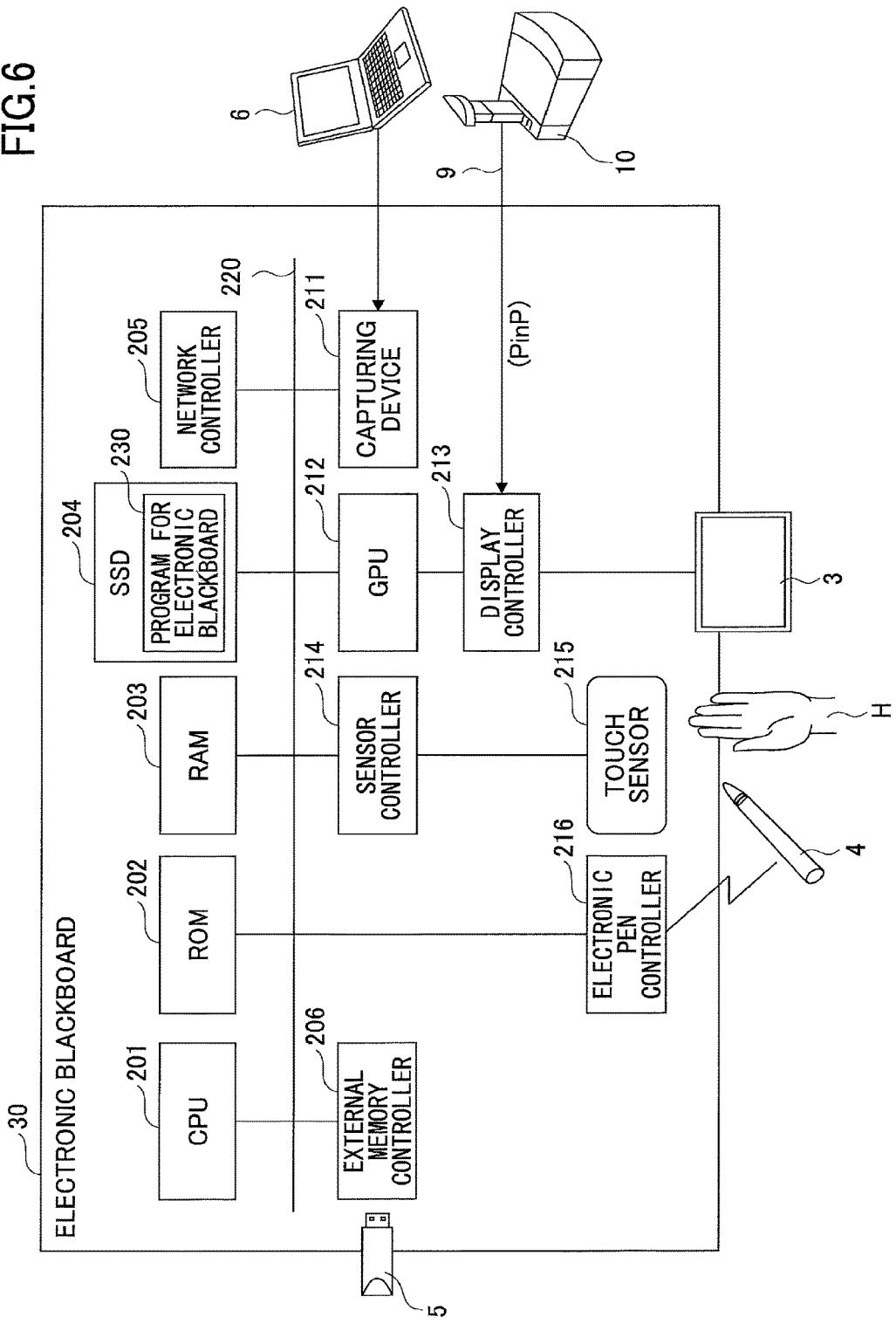
FIG. 6 is an example of a hardware configuration diagram of an electronic blackboard.

Next, using FIG. 6, a hardware configuration of the electronic blackboard 30 will be described. FIG. 6 is an example of a hardware configuration diagram of the electronic blackboard 30.

The electronic blackboard 30 includes a CPU 201 to control the overall behavior of the electronic blackboard 30; a ROM 202 to store programs to be used for driving the CPU 201, such as an IPL (Initial Program Loader); a RAM 203 used as a work area for the CPU 201 an SSD 204 to store various data of a program for an electronic blackboard; a network controller 205 to control communication with the second communication network N2; and an external memory controller 206 to control communication with the USB memory 5.

Also, the electronic blackboard 30 includes a capturing device 211 to capture a still picture or a moving picture that is displayed on a display by the note PC 6; a GPU (Graphics Processing Unit) 112 dedicated to processing graphics; and a display controller 213 to control and manage a screen display to output an image output from the GPU 112 and an image output from the transmission terminal 10 to the display 3.

Furthermore, the electronic blackboard 30 includes a sensor controller 214 to control a process of a touch sensor 215; and the touch sensor 215 to detect a contact of the electronic pen 4 or the user's hand H on the display 3. This touch sensor 215 receives coordinates as input by an infrared cut-off method, and detects the coordinates. The touch sensor 215 is not limited to an infrared cut-off method, but may be a touch panel of an electrostatic capacitance type that identifies a contact position by detecting a change of the electrostatic capacitance. Also, various detection units may be used including a touch panel of a resistance film method to identify a contact position by a voltage change of two resistor films facing each other, and a touch panel of an electromagnetic induction type to identify a contact position by detecting electromagnetic induction generated by a contact object contacting the display unit.

Also, the electronic blackboard 30 includes an electronic pen controller 216. This electronic pen controller 216 communicates with the electronic pen 4, to determine whether there is a touch by the pen point or a touch by the pen tail on the display 3.

Furthermore, the electronic blackboard 30 includes a bus line 220 including an address bus, a data bus, and the like to electrically connect the CPU 201, the ROM 202, the RAM 203, the SSD 204, the network controller 205, the external memory controller 206, the capturing device 211, the GPU 212, the sensor controller 214, and the electronic pen controller 216 as illustrated in FIG. 6.

Also, in the embodiment, the transmission terminal 10 and the electronic blackboard 30 are connected by wire or wirelessly. Here, a likelihood that a malicious third person obtains information being communicated by such short-distance wireless connection and wired connection (so-called "eavesdropping on a network") will be described. First, direct connection has no eavesdropping risk because only devices that are physically connected with each other transmit and receive information. Also, short-distance wireless communication has fairly low eavesdropping risk and the communication can be done comparatively safe because it is possible to confirm that there is no eavesdropper within sight of the user. Therefore, it may be determined that safe communication can be done between the electronic blackboard 30 and the transmission terminal 10 that exist at the same site.

<Functional Configuration>

Figure 7:
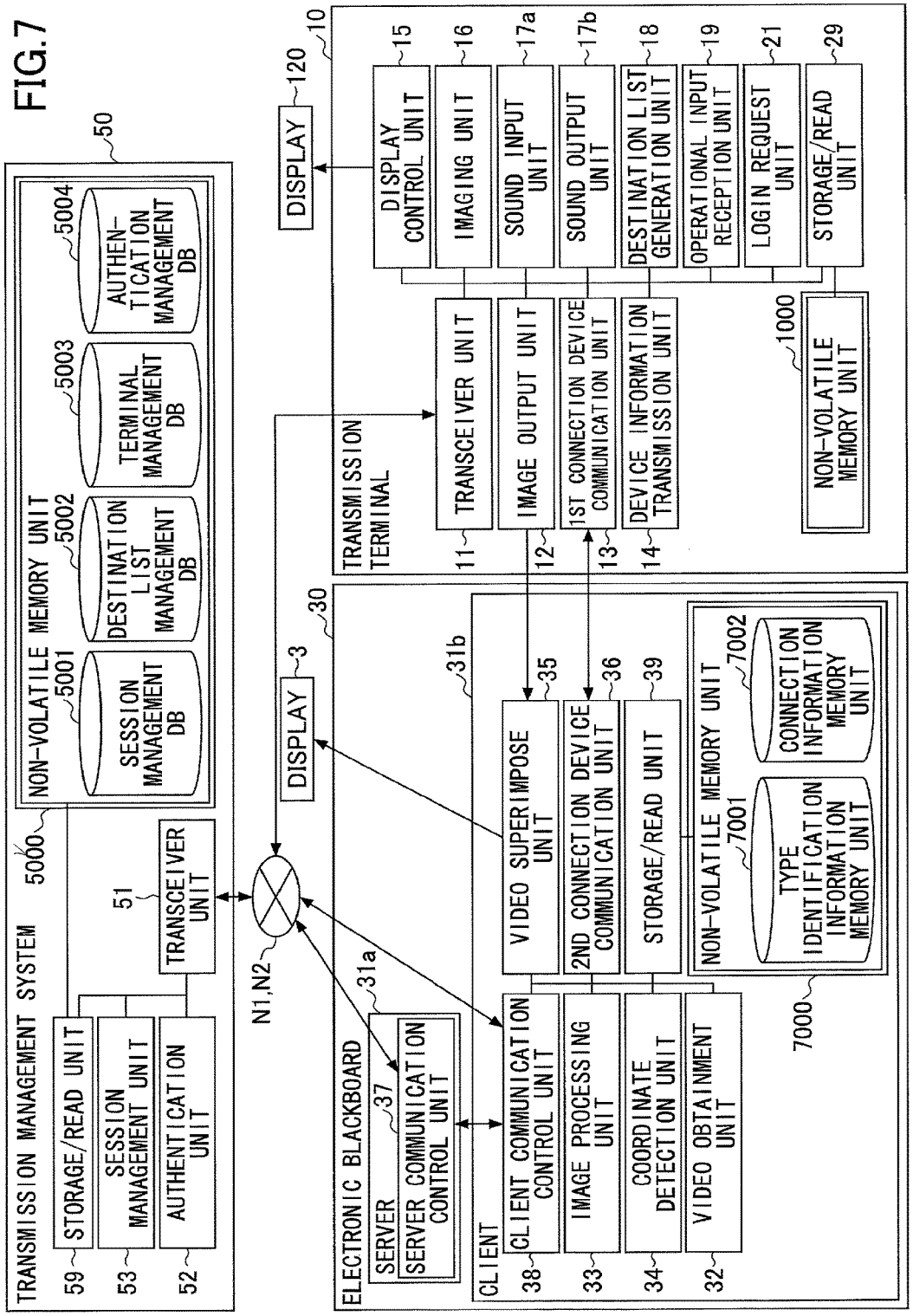
FIG. 7 is an example of functional block diagrams of a transmission terminal, a transmission management system, and an electronic blackboard included in a first communication system S1 and a second communication system S2.

Next, using FIG. 7, functional configurations of the transmission terminal 10, the transmission management system 50, and the electronic blackboard 30 will be described. FIG. 7 is an example of functional block diagrams of the transmission terminal 10, the transmission management system 50, and the electronic blackboard 30 included in the first communication system S1 and the second communication system S2.

Note that the relay device 40 and the program providing system 90 are omitted in FIG. 7 because they are not directly relevant in the embodiment. Also, the mobile terminal 20 has substantially the same functions as the transmission terminal 10, and even if there are differences, they may induce no problem to implement the embodiment.

<<Functional Units of Transmission Terminal>>

The transmission terminal 10 includes a transceiver unit 11, an image output unit 12, a first connection device communication unit 13, a device information transmission unit 14, a display control unit 15, an imaging unit 16, a sound input unit 17a, a sound output unit 17b, a destination list generation unit 18, an operational input reception unit 19, a login request unit 21, and a storage/read unit 29. These units included in the transmission terminal 10 are implemented by relevant hardware elements shown in FIG. 3 operated by instructions from the CPU 101 following the program for a terminal 130 loaded on the RAM 103 from the flash memory 104.

Also, the transmission terminal 10 includes a non-volatile memory unit 1000 constituted with the flash memory 104 illustrated in FIG. 3.

The transceiver unit 11 of the transmission terminal 10 is implemented by instructions from the CPU 101 illustrated in FIG. 3, and the network I/F 111 illustrated in FIG. 3. The transceiver unit 11 transmits and receives various data with other transmission terminals 10, the transmission management system 50, and the relay device 40 via the first communication network N1.

The image output unit 12 is implemented by instructions from the CPU 101, the display I/F 117, the external device connection I/F 118 and the like illustrated in FIG. 3, to output an image to be output on the display 120 to the electronic blackboard 30. Note that only one of the display 120 and the electronic blackboard 30 may be connected.

The first connection device communication unit 13 is implemented by instructions from the CPU 101, the display I/F 117, the network I/F 111, the external device connection I/F 118 and the like illustrated in FIG. 3, to detect the electronic blackboard 30, and to communicate with the electronic blackboard 30. The communication method may be a wired connection such as Ethernet (trademark) and HDMI (trademark) cable, wireless communication such as Bluetooth (trademark) and wireless LAN, or near field communication such as NFC (trademark). Specifically, the first connection device communication unit 13 receives connection information and type identification information (type information), which will be described later, from the electronic blackboard 30. If connected by an HDMI cable, output of video/sound and exchange of control information can be executed at the same time by a single cable. Also, if connected by Bluetooth (trademark), wireless communication is possible, within a comparatively short distance.

The device information transmission unit 14 uses the transceiver unit 11, and transmits the connection information and the type identification information received by the first connection device communication unit 13, to the other transmission terminal 10 with which a session is established via the transmission management system 50.

The display control unit 15 is implemented by instructions from the CPU 101 illustrated in FIG. 3, and the display I/F 117 illustrated in FIG. 3, to control transmitting (outputting) image data to the external display 120.

The imaging unit 16 is implemented by instructions from the CPU 101, the camera 112 and the imaging device I/F 113 illustrated in FIG. 3, to capture an object, and to output the captured image data.

The sound input unit 17a is implemented by instructions from the CPU 101, and the sound input/output I/F 116 illustrated in FIG. 3, to receive audio data input as a sound signal having been converted from a user's voice by the microphone 114.

The sound output unit 17b is implemented by instructions from the CPU 101, and the sound input/output I/F 116 illustrated in FIG. 3, to output a sound signal of audio data to the loudspeaker 115, and to have the loudspeaker 115 generate the sound.

The destination list generation unit 18 is implemented by instructions from the CPU 101 illustrated in FIG. 3, to generate and update an address list based on destination state information (working states of destination candidate terminals, a transmission terminal 10 and a mobile terminal 20 as destination candidates) received from the transmission management system 50.

The operational input reception unit 19 is implemented by instructions from the CPU 101, the operational buttons 108 and the power switch 109 illustrated in FIG. 3, to receive various inputs by the user. For example, if the user, turns on the power switch 109 illustrated in FIG. 3, the operational input reception unit 19 receives the power-on, and turns on the power.

The login request unit 21 is implemented by instructions from the CPU 101 illustrated in FIG. 3. In response to the power-on (or in response to an authentication operation by the user), the login request unit 21 automatically transmits login requesting information and a current IP address of the requesting terminal from the transceiver 11 to the transmission management system 50 via the first communication network N1.

The storage/read unit 29 is implemented by instructions from the CPU 101, and the SSD 105 illustrated in FIG. 3, to store various data in the non-volatile memory section 1000, or to read various data from the non-volatile memory section 1000. The non-volatile memory section 1000 stores communication IDs (IDentifications), type identification information, passwords and the like to identify a terminal or a user of a transmission terminal 10 as a communication destination. Note that the communication ID and the password may not be stored in the non-volatile memory unit 1000, but, for example, may be input by the user every time the user makes a login request on the transmission management system 50.

Note that the communication ID in the embodiment is identification information to uniquely identify a transmission terminal or a user who uses the transmission terminal, which is represented by languages, characters, symbols, various marks, and the like, or a combination of these. Also, the communication ID and the relay device ID may be identification information that is represented by a combination of at least two of the languages, characters, symbols, and various marks.

<<Functional Units of Transmission Management System>>

The transmission management system 50 includes a transceiver unit 51, an authentication unit 52, a session management unit 53, and a storage/read unit 59. These units are implemented by relevant elements illustrated in FIG. 4 operated by instructions from the CPU 301 following the program for transmission control 320 loaded on the RAM 303 from the HD 304. Also, the transmission management system 50 includes a non-volatile memory unit 5000 in which stored contents of various data (or information) are maintained while the power of the transmission management system 50 is turned off. The transmission management system 50 is constituted with the HD 304 illustrated in FIG. 4.

TABLE 1

(SESSION MANAGEMENT TABLE)

| SESSION ID | RELAY DEVICE ID | REQUEST SOURCE COMMUNICATION ID | DESTINATION COMMUNICATION ID |
|---|---|---|---|
| se1 | 111a | 01aa | 01ab |
| se2 | 111b | 01ca | 01cb |
| se3 | 111d | 01bb | 01da |
| ... | ... | ... | ... |

In the non-volatile memory section 5000, a session management DB (database) 5001 is configured with a session management table as illustrated in Table 1. In this session management table, for each session ID used for executing a session to select a relay device 40, the session ID is associated with the relay device ID of the relay device 40, the communication ID of the requesting terminal, and the communication ID of the destination terminal, to be managed.

TABLE 2

(DESTINATION LIST MANAGEMENT TABLE)

| COMMUNICATION ID | COMMUNICATION ID OF DESTINATION CANDIDATE |
|---|---|
| 01aa | 01ab, 01ba, 02ab, 02ac, 02ad |
| 01ab | 01aa, 01ba, 02ab, 02ac, 02ad |
| 01ba | 01aa, 01ab, 02ab, 02ac, 02ad |
| 02ab | 01aa, 01ab, 01ba, 02ac, 02ad |
| 02ac | 01aa, 01ab, 02ba, 02ac, 02ad |
| 02ad | 01aa, 01ab, 01ba, 02ab, 02ac |

In the non-volatile memory section 5000, a destination list management DB 5002 is configured with an address list management table to manage destination information as illustrated in Table 2. In the address list management table, for each communication ID of a requesting terminal that requests to start a connection (a call) in a video-conference, the communication ID is associated with communication IDs of all the transmission terminals 10 and mobile terminal 20 that are destination candidates. The communication ID of a destination candidate identifies a transmission terminal 10 or a mobile terminal 20 with which the requesting terminal can start communication.

TABLE 3

(TERMINAL MANAGEMENT TABLE)

| COMMUNICATION ID | WORKING STATE | NAME | IP ADDRESS |
|---|---|---|---|
| 01aa | ONLINE | HEAD OFFICE | 1.2.1.3 |
| 01ab | ONLINE | TOKYO OFFICE | 1.2.1.4 |
| 01ba | OFFLINE | OSAKA OFFICE | 1.2.2.3 |
| 02ab | ONLINE | YAMADA Taro | 1.4.1.2 |
| 02ac | ONLINE | SATO Jiro | 1.5.1.1 |
| 02ad | OFFLINE | Ito Saburo | 1.5.1.2 |

In the non-volatile memory section 5000, a terminal management DB 5003 is configured with a terminal management table as illustrated in Table 3. In this terminal management table for each communication ID of the transmission terminal 10, the communication ID is associated with the working state of the transmission terminal 10, the name of the communication ID as the destination, and the IP address of the terminal.

TABLE 4

(AUTHENTICATION MANAGEMENT TABLE)

| COMMUNICATION ID | PASSWORD |
|---|---|
| 01aa | aaaa |
| 01ab | abab |
| 01ba | baba |
| 02ab | ABAB |
| 02ac | ACAC |
| 02ad | ADAD |

In the non-volatile memory section 5000, an authentication management DB 5004 is configured with an authentication management table as illustrated in Table 4. In this authentication managing table, for each of the communication IDs of the terminals 10 or users, the communication ID is associated with the password of the terminal 10 or the user. Note that although Table 4 illustrates passwords in plaintext for the sake of explanation, the passwords may be encrypted and managed in the authentication management table.

<<Functional Units of Transmission Management System>>

Next, functional units of the transmission management system 50 will be described in detail. The transceiver unit 51 is implemented by instructions from the CPU 301 illustrated in FIG. 4, and the network I/F 309 illustrated in FIG. 4, to transmit and receive various data (or information) with other transmission terminals 10, the transmission management system 50, and the relay device 40 via the first communication network N1.

The authentication unit 52 is implemented by instructions from the CPU 301 and the like illustrated in FIG. 4. The authentication unit 52 authenticates the transmission terminal 10 or the user depending on whether a combination of a communication ID and a password included in login request information received via the transceiver unit 51 matches one of the combinations registered in the authentication management DB 5004. Note that the authentication method is not limited to that, but a client certificate (a method for authentication that uses a public key and a private key) may be used.

The session management unit 53 is implemented by instructions from the CPU 301 illustrated in FIG. 4. The session management unit 53 obtains a connection request to a destination terminal from the transmission terminal 10 that has been authenticated by the authentication unit 52. Then, the session management unit 53 associates the relay device ID of the relay device 40 to relay contents data, with the session ID, the communication ID of the requesting terminal, and the communication ID of the destination terminal, and stores the association in the session management DB 5001 to be managed.

The storage/read unit 59 is implemented by instructions from the CPU 301 illustrated in FIG. 4, and the HDD 305 illustrated in FIG. 4, to store various data in the non-volatile memory section 5000, or to read various data from the non-volatile memory section 5000.

<<Functional Units of Electronic Blackboard>>

The electronic blackboard 30 includes a server 31a and a client 31b. The client 31b further includes a video obtainment unit 32, a client communication control unit 38, an image processing unit 33, a coordinate detection unit 34, a video superimpose unit 35, a second connection device communication unit 36, and a storage/read unit 39. These units are implemented by relevant elements illustrated in FIG. 6 operated by instructions from the CPU 201 following a program for an electronic blackboard 230 loaded on the RAM 203 from the SSD 204.

Also, the electronic blackboard 30 includes a non-volatile memory unit 7000 in which stored contents of various data (or information) are maintained while the power of the electronic blackboard 30 is turned off. The non-volatile memory unit 7000 is constituted with the SSD 204 illustrated in FIG. 6.

TABLE 5

| (TYPE IDENTIFICATION INFORMATION) | |
|---|---|
| Type | interactive whiteboard |

In the non-volatile memory unit 7000, a type identification information memory unit 7001 is configured to store type identification information as illustrated in Table 5. The type identification information is information that represents terminal types. For the electronic blackboard 30, it is identification information to represent that the device type is an electronic blackboard. The specific type identification information of the electronic blackboard 30 is, for example, the "interactive whiteboard". If the device is a projector, the type identification information is, for example, "projector". If the device is a transmission terminal, the type identification information is, for example, the "video conference".

Note that the devices are limited those, but may be an electronic signboard (digital signage), a telestrator used for sports and weather forecast, and a diagnostic device of remote images (videos).

TABLE 6

| (CONNECTION INFORMATION MEMORY UNIT) | |
|---|---|
| IP ADDRESS | 2.1.1.1 |
| PASSCODE | * * * * |

In the non-volatile memory unit 7000, a connection information memory unit 7002 is configured to store connection information as illustrated in Table 6. The connection information is, for example, the IP address and the passcode of the electronic blackboard 30. The connection information is information for the electronic blackboard 30ab at the other site to be authenticated by the electronic blackboard 30aa to be connected (to start communication). Note that the connection information may include other information such as an SSID and an encryption key. Also, the passcode may be generated as a one-time password every time of authentication.

<<Functional Units of Electronic Blackboard>>

Next, functional units of the electronic blackboard 30 will be described in detail. In the second communication system S2 by the electronic blackboards 30, there is a host device of a conference, which is the electronic blackboard 30aa, and there is a participating device, which is the electronic blackboard 30ab. Among these, the host device operates the server 31a and the client 31b, whereas the participating device operates only the client 31b. The server 31a is implemented by instructions from the CPU 201, and the network controller 205 and the like illustrated in FIG. 6, to provide server functions for the electronic blackboard 30 as the participating device, and the client 31b of the device itself (the host device). In FIG. 5, in the case where the electronic blackboard 30aa is the host device, and the electronic blackboard 30ab is the participating device, the client 31b of the electronic blackboard 30aa communicates with the client 31b of the other electronic blackboard 30ab via the server 31a implemented on the same electronic blackboard 30aa. On the other hand, the client 31b of the electronic blackboard 30ab communicates with the client 31b of the electronic blackboard 30aa via the server 31a implemented on the electronic blackboard 30aa.

The video obtainment unit 32 of the client 31b is implemented by instructions from the CPU 201, the capturing device 211 and the like illustrated in FIG. 6, to obtain a video output from a video output device such as the note PC 6 connected by the cable 9. In the following, an obtained image will be referred to as the "background image".

The coordinate detection unit 34 is implemented by instructions from the CPU 201, the touch sensor 215 and the like illustrated in FIG. 6, to detect the coordinate position of an event generated by a user on the display 3 (a touch operation by the electronic pen 4 or the user's hand H on the display 3). A series of coordinates drawn by the electronic pen 4 or the hand H (after the pen point has touched until detached) will be referred to as a "stroke". Also, the coordinate detection unit 34 obtains an operation on the UI (various menus) displayed on the display 3. In the following, an image in which a series of coordinates are connected, and a stroke is drawn will be referred to as a "stroke image".

The image processing unit 33 is implemented by instructions from the CPU 201, the GPU 212, the display controller 213 and the like illustrated in FIG. 6, to superpose image layers of a stroke image, a background image obtained by the video obtainment unit 32, and a UI image in which menus are drawn.

The video superimpose unit 35 is implemented by instructions from the CPU 201, the GPU 212, the display controller 213 and the like illustrated in FIG. 6, to display images superposed by the image processing unit 33 as a video on the display 3. Also, the video superimpose unit 35 shows the video transmitted from the transmission terminal 10 and the like on the background image by picture-in-picture.

The second connection device communication unit 36 is implemented by instructions from the CPU 201, the external memory controller 206, the display controller 213, the network controller 205 and the like illustrated in FIG. 6, to detect a transmission terminal 10 and to communicate with the transmission terminal 10. Specifically, the second connection device communication unit 36 transmits the connection information and the type identification information to the transmission terminal 10.

The client communication control unit 38 is implemented by instructions from the CPU 201, the network controller 205 and the like illustrated in FIG. 6, to transmit various data to the server communication control unit 37, and to receive various data from the server communication control unit 37. Specifically, the client communication control unit 38 transmits and receives a background image obtained from the note PC 6 by the video obtainment unit 32, a stroke image obtained by the coordinate detection unit 34, and contents of operations on the UI. Note that the communication partner, or the server communication control unit 37, may be included in the electronic blackboard 30 in the same housing, or may be included in the other electronic blackboard 30.

The storage/read unit 39 is implemented by instructions from the CPU 201 illustrated in FIG. 6, and the SSD 204 and the like illustrated in FIG. 6, to store various data in the non-volatile memory section 7000, or to read various data from the non-volatile memory section 7000.

<Communication Process of Transmission Terminal 10>

Figure 8:
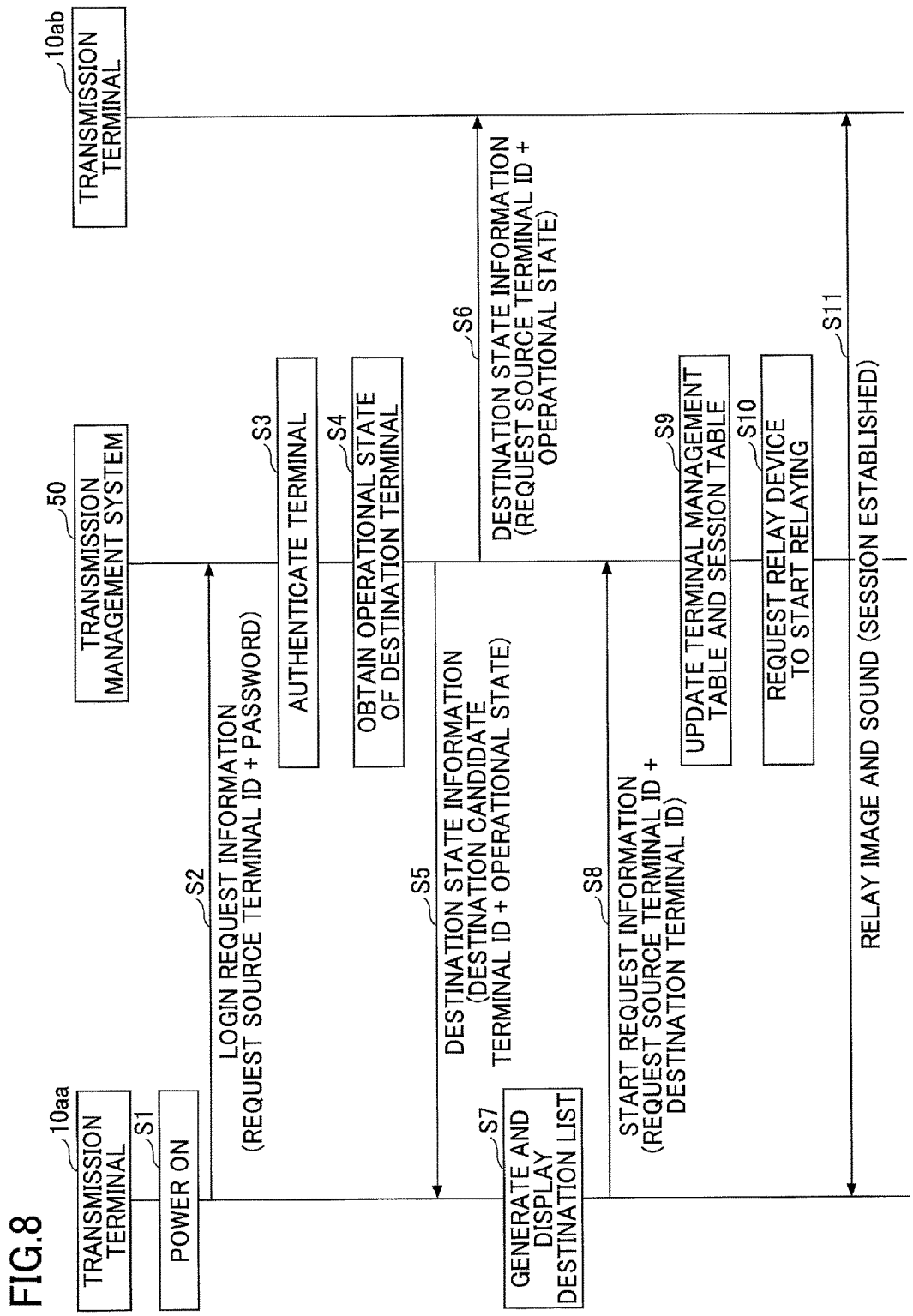
FIG. 8 is an example of a sequence chart that illustrates steps to establish a session between transmission terminals 10aa and 10ab.

First, using FIG. 8, steps to establish a session by the transmission terminals 10aa and 10ab in the first communication system S1, will be described. FIG. 8 is an example of a sequence chart that illustrates steps to establish a session by the transmission terminals 10aa and 10ab.

S1: When the user turns on the power switch 109, the operational input reception unit 19 receives the power-on operation, and turns on the power.

S2: In response to the power-on, the login request unit 21 automatically transmits login request information that represents a login request to the transmission management system 50 from the transceiver unit 11 via the first communication network N1. A login request can be transmitted not only upon the power-on, but also at any timing by a user operation. The login request information includes the communication ID and the password to identify the request source, namely, the transmission terminal 10aa. Note that when the login request information is transmitted from the transmission terminal 10aa to the transmission management system 50, the transmission management system 50 on the receiving side can grasp the IP address of the transmission terminal 10aa.

S3: The authentication unit 52 of the transmission management system 50 determines whether the same communication ID and password as the communication ID and password included in the login request information received via the transceiver unit 51 is managed in the authentication management table, to execute terminal authentication.

S4: If the transmission terminal 10aa is authenticated by the authentication unit 52, the session management unit 53 reads the communication ID of a destination terminal which is the destination candidate of the transmission terminal 10aa, from the destination management table, and reads the working state of the destination terminal from the terminal management table. In this process, the destination terminal, namely, the transmission terminal 10ab is assumed to be online.

S5: Next, the transceiver unit 51 transmits destination state information that includes the communication IDs and the working states of transmission terminals as the destination candidates, to the transmission terminal 10aa via the first communication network N1. The destination state information includes names that are registered in the terminal management table. Thus, the transmission terminal 10aa can grasp the current working state of the transmission terminal 10ab in the address list that can communicate with the transmission terminal 10aa.

S6: Note that the transceiver unit 51 transmits the communication ID and the working state of the transmission terminal 10aa that has made the login request, to transmission terminals (here, the transmission terminal 10ab) that can have the transmission terminal 10aa included in the address list. Thus, the transmission terminals 10 as destination candidates registered in the address list can mutually grasp the working states of the partners.

S7: In response to receiving the destination state information, the destination list generation unit 18 of the transmission terminal 10aa generates an address list, and has the display 120 display the address list. The user of the transmission terminal 10aa can select a communication ID to which a request to start communication will be sent, on an address list screen. Assume that the transmission terminal 10ab is selected in this example.

S8: Upon the request to start communication with the destination selected by the user, the transceiver unit 11 of the transmission terminal 10aa transmits the start request information to the transmission management system 50. The start request information includes the requesting terminal ID and the destination terminal ID. By this information, the transceiver unit 51 of the transmission management system 50 grasps the IP address of the requesting terminal 10aa.

S9: The session management unit 53 of the transmission management system 50 updates the terminal management table and the session table. Specifically, the session management unit 53 selects a relay device 40, and registers a new record in the session management table, and associates it with the transmission terminals 10aa and 10ab in the terminal management table, and sets the working state to "in call".

S10: The transceiver unit 51 requests the selected relay device 40 to start relaying. Thus, the relay device 40 grasps the IP addresses of the transmission terminals 10aa and 10ab, and establishes a session to communicate image data and audio data. Therefore, the transmission terminals 10aa and 10ab can start a video-conference.

<Communication Process of Electronic Blackboard>

Figure 9:
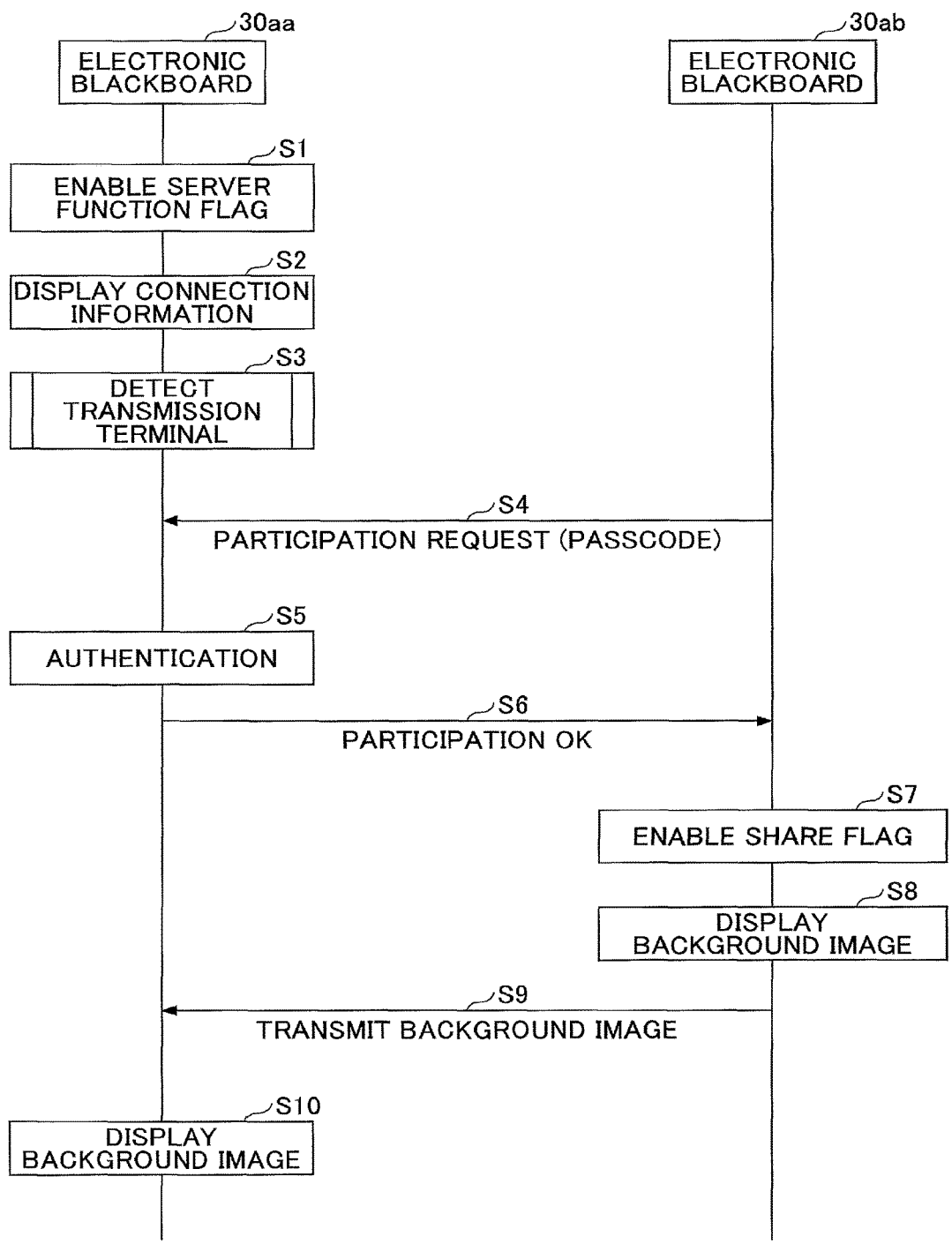
FIG. 9 is an example of a sequence chart that illustrates steps to start a conference between electronic blackboards 30aa and 30ab.

First, using FIG. 9, steps to establish a session by the electronic blackboards 30aa and 30ab in the second communication system S2, will be described. FIG. 9 is an example of a sequence chart that illustrates steps to start a conference by the electronic blackboards 30aa and 30ab.

S1: When the user turns on the power switch of the electronic blackboard 30aa, the client 31b of the electronic blackboard 30aa is started up. Then, the user operates on the input unit such as the touch panel to start up the server 31a, and the server 31a of the electronic blackboard 30aa is started up.

S2: Next, the video superimpose unit 35 of the electronic blackboard 30aa reads the connection information from the connection information memory unit 7002, and has the display 3a display the connection information. This connection information includes the IP address and the passcode of the electronic blackboard 30aa as the host device. Conventionally, such connection information has been transferred from the user of the electronic blackboard 30aa to the user B of the electronic blackboard 30ab by telephone or electronic mail.

S3: Next, the second connection device communication unit 36 of the electronic blackboard 30aa transmits the connection information and the type identification information to the transmission terminal 10. This process will be described later with reference to FIG. 10. Also, if the transmission terminal 10 is connected with the electronic blackboard 30*aa*, the electronic blackboard 30*aa* may not display the connection information at Step S2.

S4: Next, conventionally, the electronic blackboard 30*ab* receives input of the connection information from the input unit such as the touch panel operated by the user. In the embodiment, the connection information is transmitted from the transmission terminal 10*ab* to the electronic blackboard 30*ab*. Based on the IP address included in the connection information, the client communication control unit 38 of the electronic blackboard 30*ab* transmits the passcode to the server 31*a* of the electronic blackboard 30*aa*, and makes a request for participation.

S5: The server 31*a* of the electronic blackboard 30*aa* authenticates the electronic blackboard 30*ab*. In other words, the server 31*a* determines whether the passcode included in the request for participation matches the passcode of the connection information displayed on the display 3*a* by the electronic blackboard 30*aa* at Step S2.

S6: If the authentication succeeds, the server 31*a* of the electronic blackboard 30*aa* returns participation OK to the request for participation.

S7: Thus, communication is established between the electronic blackboard 30*aa* as the host device, and the electronic blackboard 30*ab* as the participating device by a remote shared process. The client 31*b* of the electronic blackboard 30*ab* enables a flag to start the remote shared process with the electronic blackboard 30*aa* (this step is referred to as "enabling the shared flag").

S8: The electronic blackboard 30*ab* displays, for example, the background image obtained from the note PC 6*b* on the display 3*b*.

S9: The client 31*b* of the electronic blackboard 30*ab* transmits the background image to the server 31*a* of the electronic blackboard 30*aa*.

S10: The server 31*a* of the electronic blackboard 30*aa* transmits the background image to the client 31*b* of the device itself, and the image processing unit 33 and the video superimpose unit 35 of the electronic blackboard 30*aa* display the background image on the display 3*a*.

<Authentication Process of Electronic Blackboard 30 by Using First Communication System S1>

Figure 10:
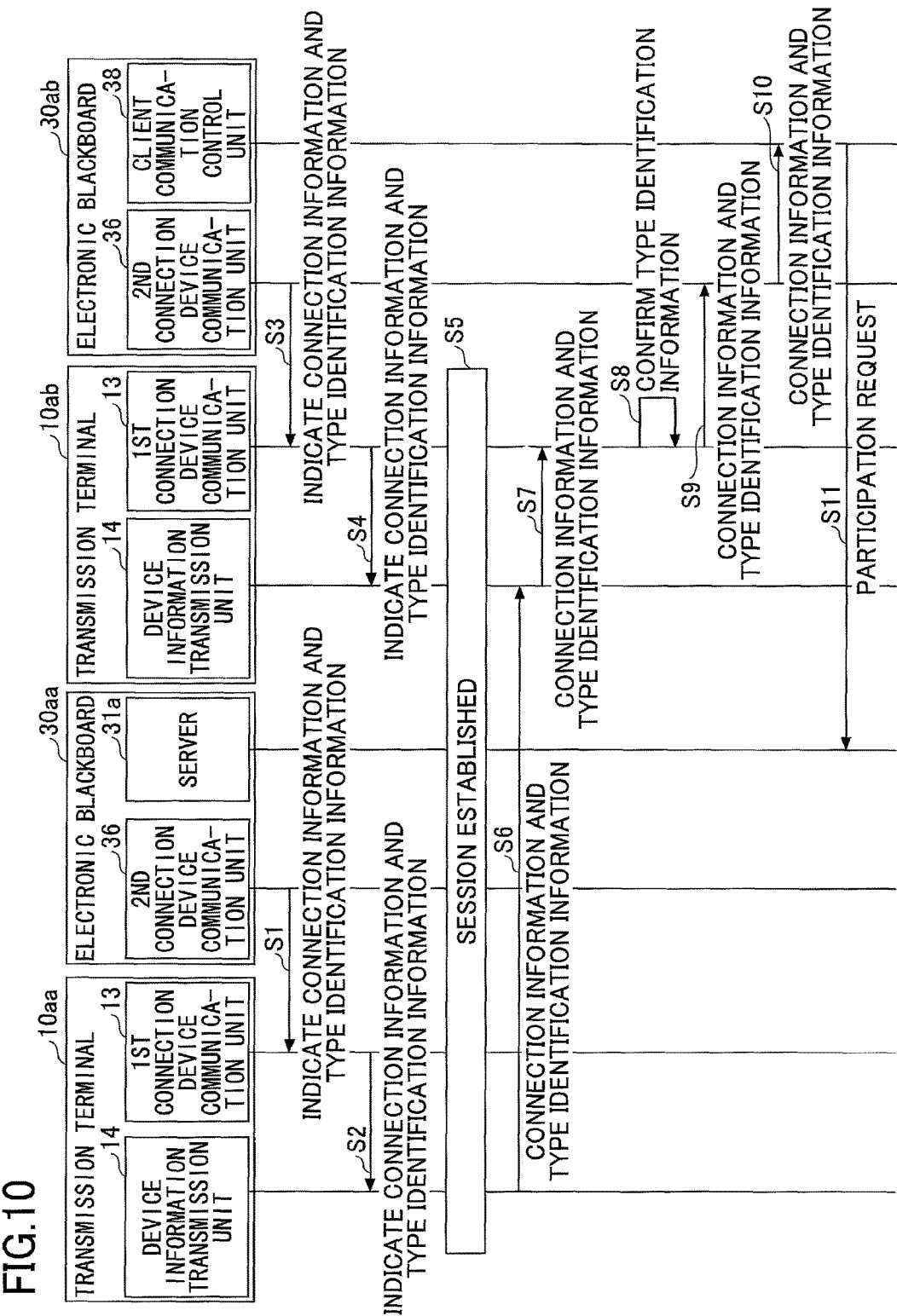
FIG. 10 is an example of a sequence chart that illustrates steps to have an electronic blackboard 30ab authenticated by an electronic blackboard 30aa by using a first communication system S1.

Next, using FIG. 10, steps to have the electronic blackboard 30*ab* authenticated by the electronic blackboard 30*aa* by using the first communication system S1, will be described. FIG. 10 is an example of a sequence chart that illustrates steps to have the electronic blackboard 30*ab* authenticated by the electronic blackboard 30*aa* by using the first communication system S1.

First, as a preparatory step, a user A puts the transmission terminal 10*aa* and the electronic blackboard 30*aa* into a state where wired or wireless communication can be made. In other words, the power of the transmission terminal 10*aa* and the electronic blackboard 30*aa* are turned on, respectively, and before or after the power-on, the transmission terminal 10*aa* is connected with the electronic blackboard 30*aa* by wire or wirelessly. It is the same for the transmission terminal 10*ab* and the electronic blackboard 30*ab*.

S1: The first connection device communication unit 13 of the transmission terminal 10*aa* detects the electronic blackboard 30*aa* (may not recognize that it is the electronic blackboard 30 at the timing of detection), and the second connection device communication unit 36 of the electronic blackboard 30*aa* detects the transmission terminal 10. Upon detecting a connected device, the second connection device communication unit 36 of the electronic blackboard 30*aa* automatically (without a user operation) indicates the connection information and the type identification information to the first connection device communication unit 13 of the transmission terminal 10*aa*.

S2: The first connection device communication unit 13 of the transmission terminal 10*aa* indicates the connection information and the type identification information to the device information transmission unit 14.

S3: Similarly, upon detecting a connected device, the second connection device communication unit 36 of the electronic blackboard 30*ab* automatically (without a user operation) indicates the connection information and the type identification information to the first connection device communication unit 13 of the transmission terminal 10*ab*.

S4: The first connection device communication unit 13 of the transmission terminal 10*ab* indicates the connection information and the type identification information to the device information transmission unit 14.

S5: Here, the transmission terminal 10*aa* and the transmission terminal 10*ab* log in (to be authenticated by) the transmission management system 50 and establish a session by the steps described with FIG. 8. The connection information and the type identification information may be indicated after the session has been established.

S6: Taking advantage of the session established with the transmission terminal 10*ab*, the device information transmission unit 14 of the transmission terminal 10*aa* transmits the connection information and the type identification information to the transmission terminal 10*ab*. Although the transmission goes via the transmission management system 50 or the relay device 40, if the transmission terminal 10*ab* is connected to the same network (for example, an in-house LAN), the transmission may go directly to the transmission terminal 10*ab*.

S7: The device information transmission unit 14 of the transmission terminal 10*ab* transmits the connection information and the type identification information to the first connection device communication unit 13.

S8: The first connection device communication unit 13 of the transmission terminal 10*ab* compares the type identification information with the type identification information obtained from the electronic blackboard 30*ab* at Step S3. In other words, since the type identification information of the electronic blackboard 30 is "interactive whiteboard", it determines whether the type identification information of "interactive whiteboard" is received from the transmission terminal 10*aa*. This is because if the transmission terminal 10*aa* is connected with another device (for example, a projector), the transmission terminal 10*aa* also transmits the connection information and the type identification information to the transmission terminal 10*ab*. In this case, the electronic blackboard 30*ab* may not need to communicate with the projector, and unnecessary communication can be avoided by confirming the type identification information.

S9: If the type identification information turns out to be the same as a result of the comparison, the first connection device communication unit 13 of the transmission terminal 10*ab* transmits the connection information and the type identification information to the electronic blackboard 30*ab*. Thus, the electronic blackboard 30*ab* obtains the connection information and type identification information of the electronic blackboard 30*aa*, which have been obtained by telephone or electronic mail conventionally. Note that the determination at Step S8 may be executed by the electronic blackboard 30*aa* at this stage. Also, if the electronic blackboard 30*ab* executes the determination, the electronic blackboard 30*ab* may have in advance a list of the devices with which the electronic blackboard 30*ab* can communicate (a list of the type identification information), and may communicate with a device registered in the list.

S10: After having confirmed the type identification information, the second connection device communication unit 36 of the electronic blackboard 30*ab* transmits the connection information and the type identification information to the client communication control unit 38.

S11: As described with FIG. 9, the client communication control unit 38 communicates with the electronic blackboard 30*aa* specified as the destination by the IP address of the connection information, to transmit the passcode, and to make a request for participation.

After that, the electronic blackboard 30*aa* authenticates the electronic blackboard 30*ab*. Thus, the user B of the transmission terminal 10*ab* and the electronic blackboard 30*ab* can use the electronic blackboard 30*ab* based on a single authentication operation by having the transmission terminal 10*ab* logged in (authenticated by) the transmission management system 50. In this way, the load on a user can be reduced when starting communication between devices via a network.

Note that in the embodiment, although the transmission terminal 10 is connected only with the electronic blackboard 30, the transmission terminal 10 may be connected with two or more devices, other than the electronic blackboard 30, such as a projector.

Also, in FIG. 10, the transmission terminal 10*aa* transmits the connection information and the type identification information to the transmission terminal 10*ab*. Although not explicitly illustrated in FIG. 10, the transmission terminal 10*ab* can also transmit the connection information and the type identification information to the transmission terminal 10*aa*. The transmission terminal 10*aa* transmits the connection information and the type identification information to the electronic blackboard 30*aa*. However, the electronic blackboard 30*aa* having the server 31*a* activated does not make a request for participation to the electronic blackboard 30*ab*. Therefore, inconvenience that the electronic blackboards 30*aa* and 30*ab* make requests for participation bidirectionally, will not be generated. Alternatively, at Step S3, the second connection device communication unit 36 of the electronic blackboard 30*ab* having the server 31*a* inactivated, may transmit the connection information and the type identification information, along with information representing that no transfer is required, to the transmission terminal 10*ab*.

Also, if the electronic blackboard 30*aa* does not authenticate the electronic blackboard 30*ab* by the passcode, the electronic blackboard 30*aa* may not transmit the passcode in the connection information. This is because both the electronic blackboard 30*aa* and the electronic blackboard 30*ab* are assumed to be connected with an in-house network, and hence cannot be connected to from the outside at least.

Figure 11A:
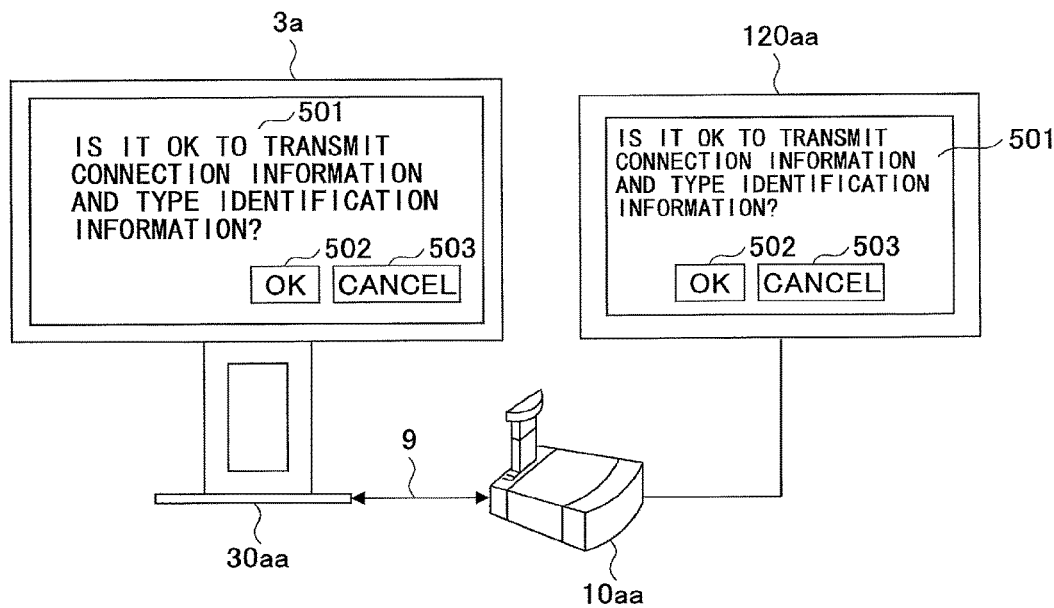
FIGS. 11A-11B are diagrams that illustrate an example of messages shown on displays of an electronic blackboard and a transmission terminal.

Also, as illustrated in FIG. 11A, before transmitting the connection information, the electronic blackboard 30*aa* may display a message on the display 3*a*. FIG. 11A illustrates an example of a message displayed on the display 3*a* of the electronic blackboard 30*aa*. For example, before Step S1 in FIG. 10, the electronic blackboard 30*aa* displays the message 501, "IS IT OK TO TRANSMIT CONNECTION INFORMATION AND TYPE IDENTIFICATION INFORMATION?". If the user A presses an OK button 502, the electronic blackboard 30*aa* transmits the connection information and the type identification information to the transmission terminal 10*aa*. If the user A presses a cancel button 503, the electronic blackboard 30*aa* does not transmit the connection information and the type identification information to the transmission terminal 10*aa*. This process can prevent the connection information and the type identification information from being transmitted out of the housing of the electronic blackboard 30*aa* before the user A knows about it.

Note that as illustrated in FIG. 11A, the same message may be displayed by the transmission terminal 10*aa*. This message may be displayed, for example, before Step S6 in FIG. 10. This process can prevent the connection information and the type identification information from being transmitted to another site before the user A knows about it. Note that as described with FIG. 1, contents on the display 120 can be displayed on the display 3 of the electronic blackboard 30. Therefore, the message may be displayed in the area Da on the display 3.

Figure 11B:
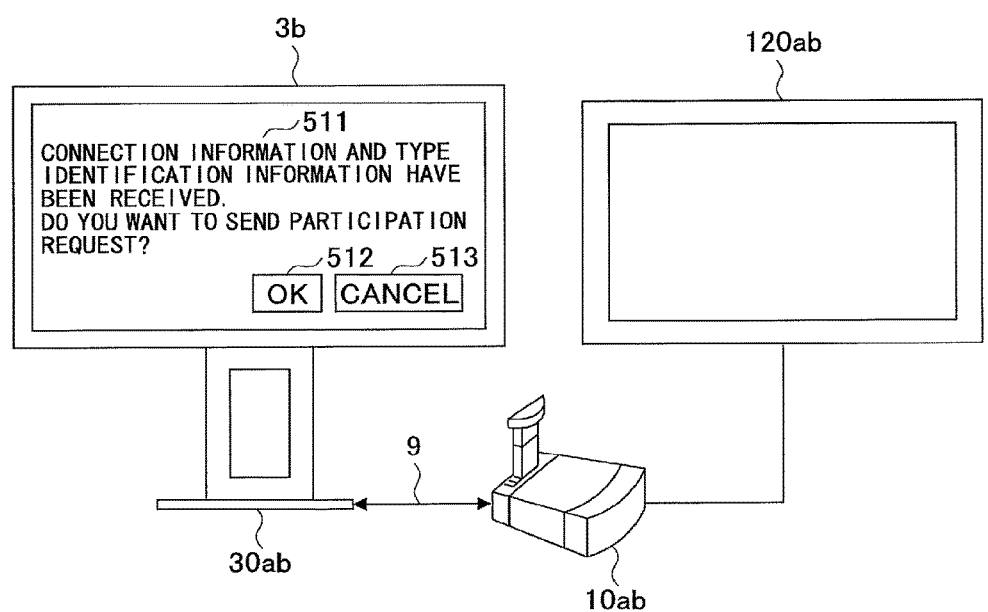

Also, as illustrated in FIG. 11B, before transmitting a request for participation, the electronic blackboard 30*ab* may display a message on the display 3*b*. For example, before Step S10 in FIG. 10, the electronic blackboard 30*ab* displays a message 511, "CONNECTION INFORMATION AND TYPE IDENTIFICATION INFORMATION HAVE BEEN RECEIVED. DO YOU WANT TO SEND PARTICIPATION REQUEST?". If the user A presses an OK button 512, the transmission terminal 10*ab* transmits a request for participation; or if the user A presses a cancel button 513, the transmission terminal 10*ab* does not transmit a request for participation. This process makes it possible for the user B to have the electronic blackboard 30*ab* participate the conference after he/she has confirmed it. For example, if the user B goes out of the room while the power switches of the transmission terminal 10*ab* and the electronic blackboard 30*ab* are on, automatic start of the conference can be avoided.

Preferable Modified Example

A case will be described where no device exists at the site of a partner with which the device at the self-site can communicate. For example, one may consider a case where the transmission terminal 10*aa* is connected with the electronic blackboard 30*aa*, but the transmission terminal 10*ab* is not connected with the electronic blackboard 30*ab*.

FIG. 12 is an example of a sequence chart that illustrates steps to have the electronic blackboard 30*ab* authenticated by the electronic blackboard 30*aa* by using the first communication system S1. Note that different points from FIG. 10 will be mainly described with FIG. 12. In FIG. 12, the transmission terminal 10*ab* is not connected with a device.

S1 to S5: The transmission terminal 10*aa* transmits the connection information and the type identification information to the transmission terminal 10*ab*, and establishes a session with the transmission terminal 10*ab*.

S6, 7: The transmission terminal 10*aa* transmits the connection information and the type identification information to the transmission terminal 10*ab*.

S8: The first connection device communication unit 13 of the transmission terminal 10*ab* determines that no device is connected, which is different from Steps S3 and S4 in FIG. 10. If any device is connected, it determines whether the device is a device with which the device itself can communicate for the type identification information transmitted from the transmission terminal 10*aa*.

S9: If having detected that no device is connected with which communication can be made, the first connection device communication unit 13 of the transmission terminal 10ab transmits to the device information transmission unit 14 that the electronic blackboard 30ab is not connected.

S10: The device information transmission unit 14 of the transmission terminal 10ab indicates to the transmission terminal 10aa that the electronic blackboard 30ab is not connected.

S11: The device information transmission unit 14 of the transmission terminal 10aa indicates to the display control unit 15 that the electronic blackboard 30ab is not connected.

S12: Thus, the display control unit 15 of the transmission terminal 10aa can display a message or the like that the electronic blackboard 30ab is not connected with the transmission terminal 10ab, on the display 120aa (display unit). Also, the transmission terminal 10aa may indicate to the electronic blackboard 30aa that the electronic blackboard 30ab is not connected.

Figure 13:
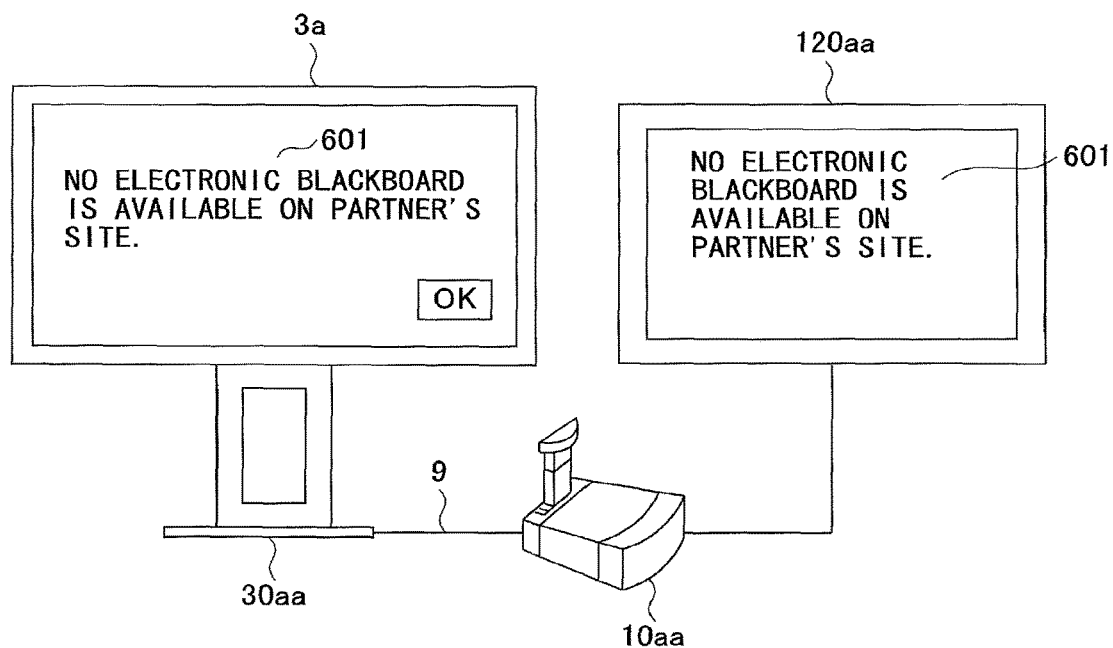
FIG. 13 is a diagram that illustrates an example of messages shown on a display connected with a transmission terminal, and a display of an electronic blackboard.

FIG. 13 is a diagram that illustrates an example of a message shown on the display 120 connected with the transmission terminal 10aa and the display 3a of the electronic blackboard 30aa. In FIG. 13, a message 601, "NO ELECTRONIC BLACKBOARD IS AVAILABLE ON PARTNER'S SITE.", is displayed on the display 120aa connected with the transmission terminal 10aa, and the display 3a of the electronic blackboard 30aa. Therefore, the user A can grasp that a conference that uses the electronic blackboards 30 is not possible.

<<Case where Multiple Transmission Terminals Exist Around Electronic Blackboard 30>>

Figure 14:
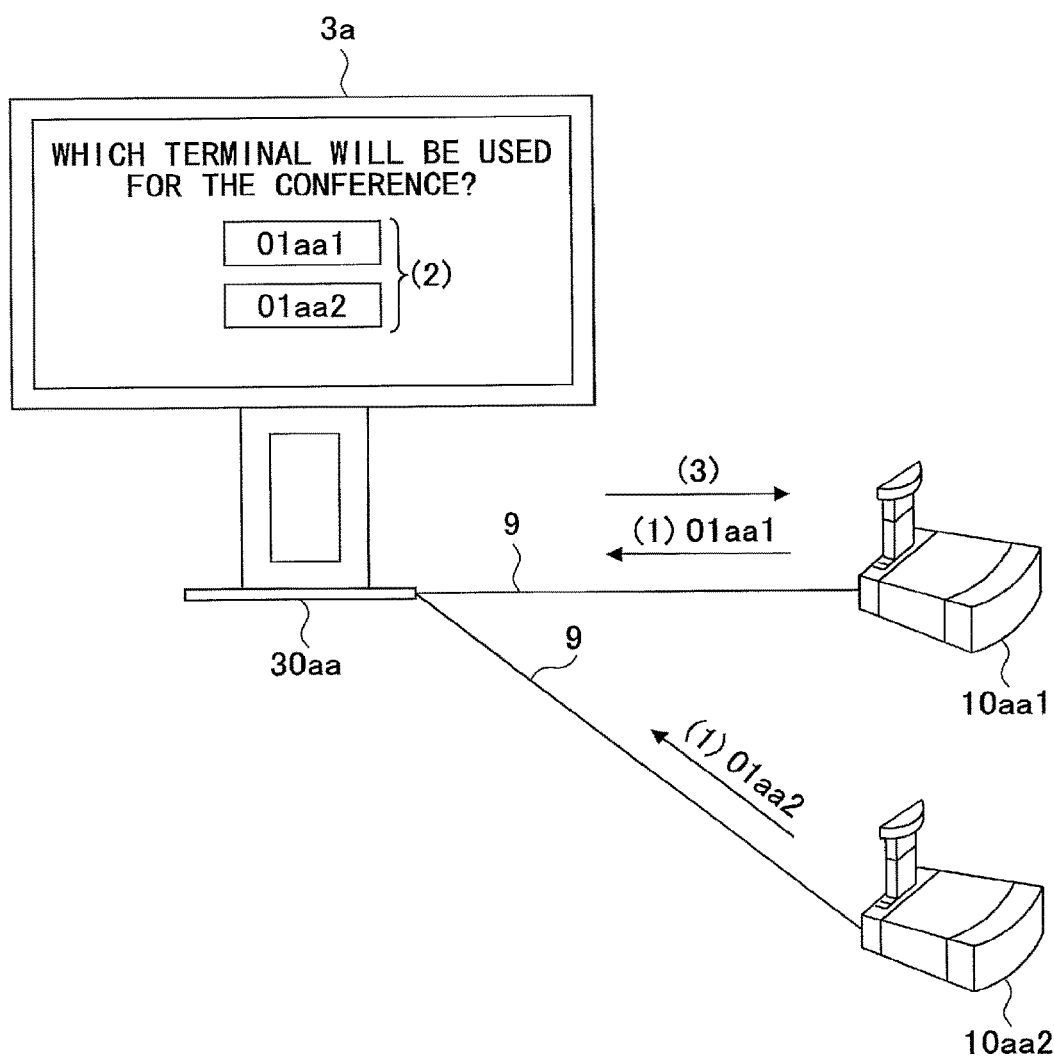
FIG. 14 is a diagram that illustrates selection of a transmission terminal in a case where multiple transmission terminals exist around an electronic blackboard.

Also, as illustrated in FIG. 14, there may be a case where multiple transmission terminals 10aa1 and 10aa2 exist around the electronic blackboard 30aa. FIG. 14 is an example of a diagram that illustrates selection of a transmission terminal 10 in the case where multiple transmission terminals 10aa1 and 10aa2 exist around the electronic blackboard 30aa. In this case, although the electronic blackboard 30aa can transmit the connection information and the type identification information to the transmission terminals 10aa1 and 10aa2, respectively, it is sufficient to transmit the connection information and the type identification information, to just one of the transmission terminals 10 that is used in the first communication system S1.

Assuming that such a case could happen, it is preferable, before Steps S1 and S2, to have the transmission terminals 10aa1 and 10aa2 transmit the respective communication IDs to the electronic blackboard 30aa so that the electronic blackboard 30aa displays the two communication IDs. For example, assume that the communication ID of the transmission terminal 10aa1 is "01aa1", and the communication ID of the transmission terminal 10aa2 is "01aa2".

(1) The transmission terminal 10aa1 and the transmission terminal 10aa2 transmit the communication IDs to the electronic blackboard 30aa, respectively.

(2) The electronic blackboard 30aa displays the two communication IDs on the display 3a. The user A can select a desired one of the transmission terminals 10aa.

(3) The electronic blackboard 30aa indicates the selection result by the user to the selected transmission terminal 10aa.

Then, only the transmission terminal 10aa that received the indication transmits the connection information and the type identification information to the transmission terminal 10ab. By providing such a mechanism, a user can select a transmission terminal 10 to be used when multiple transmission terminals 10 communicate with the electronic blackboard 30 wirelessly. It is effective, for example, for a case where a mobile terminal 20 exists around the electronic blackboard 30, in addition to a transmission terminal 10.

Second Embodiment

In this embodiment, the first communication system S1 and the second communication system S2 will be described where not only the transmission terminal 10, but also the electronic blackboard 30 communicate via an outside network. If the electronic blackboard 30 is authenticated via an outside network, by knowing that the electronic blackboard 30aa has authenticated the electronic blackboard 30ab, it is possible to have the transmission terminal 10ab authenticated by the transmission terminal 10aa. Therefore, it is effective for a case where a user inputs the communication ID and the password instead of a case where the transmission terminal 10 does not transmit the communication ID and the password upon the power-on.

In the embodiment, the electronic blackboard 30 can communicate via the outside network. Therefore, in FIG. 5, the second communication network N2 includes an outside network (for example, the Internet), and the electronic blackboard 30aa and the electronic blackboard 30ab communicate via a certain server.

Figure 15:
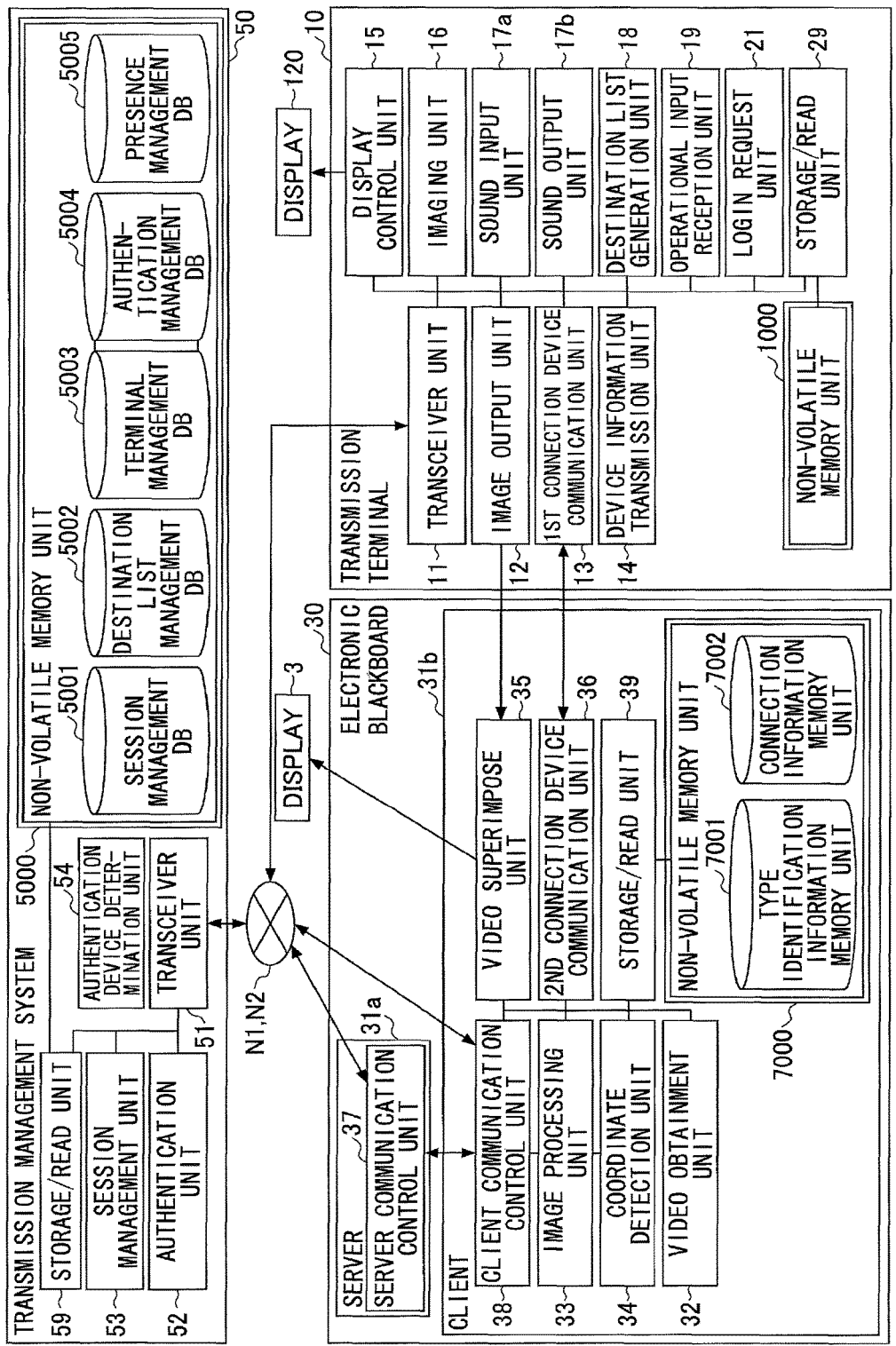
FIG. 15 is an example of functional block diagrams of a transmission terminal, a transmission management system, and an electronic blackboard included in a first communication system S1 and a second communication system S2 (a second embodiment)

FIG. 15 is an example of functional block diagrams of the transmission terminal 10, the transmission management system 50, and the electronic blackboard 30 included in the first communication system S1 and the second communication system S2.

Note that elements having the same codes throughout the specification have substantially the same functions. Therefore, description may be omitted for elements having been described once, or only different points may be described.

In the embodiment, the transmission management system 50 authenticates, not only the transmission terminal 10, but also the electronic blackboard 30. The mechanism of the authentication is assumed to be the same as the mechanism for the transmission terminal 10 in the first embodiment, and any authentication method may be adopted. In other words, the electronic blackboard 30 also has an ID to be identified uniquely, such as the communication ID. Note that for the authenticated electronic blackboards 30aa and 30ab, the background image and strokes may relayed by the relay device 40 in the same way as for the transmission terminal 10, or may relayed by the server 31a.

TABLE 7

| (PRESENCE MANAGEMENT TABLE) | |
|---|---|
| SITE ID | Type |
| 1 | video conference, interactive whiteboard |
| 2 | video conference, interactive whiteboard |
| . . . | . . . |

In the embodiment, in the non-volatile memory unit 5000, a presence management DB 5005 is configured that is constituted with a presence management table as illustrated in Table 7. In this presence management table, type identification information is associated with a site ID that identifies a site, and the association is registered. If assuming that a transmission terminal 10 exists in each site, the site ID may be, for example, the communication ID, but any ID can be used as long as the site can be identified. The type identification information represents types of devices that exist at the site.

Also, the transmission terminal 10 includes an authentication device determination unit 54. The authentication device determination unit 54 is implemented by instructions from the CPU 301 illustrated in FIG. 4, to determine a device that executes authentication for each site, and to indicate to the site the device that executes authentication. The authentication device determination unit 54 holds priority of devices that execute authentication in advance, for example, as follows.

1. video conference (video conference terminal)
2. interactive whiteboard (electronic blackboard)
3. projector (projector)
4. smart phone (mobile terminal)

The authentication device determination unit 54 determines the device to execute authentication that has the highest priority among devices that commonly exist at the sites. In the example of Table 7, the video conference is the device to execute authentication (it is the same as in the first embodiment).

Therefore, if multiple devices connectable via an external network exist at the sites, but the existing devices are not the same for the sites, the device to execute authentication can be determined. For example, if one site has types of "video conference", "interactive whiteboard", and "projector", but another site does not have the type of "video conference", but only has the types of "interactive whiteboard" and "projector", the electronic blackboard 30 is determined to be the device to execute authentication. Therefore, the electronic blackboard 30aa and the electronic blackboard 30ab authenticate each other, and by using the authentication result, the projectors can be authenticated.

Also, if the transmission management system 50 indicates the contents of the presence management table to the sites, users can easily grasp terminals that exist at the other partner sites.

Figure 16:
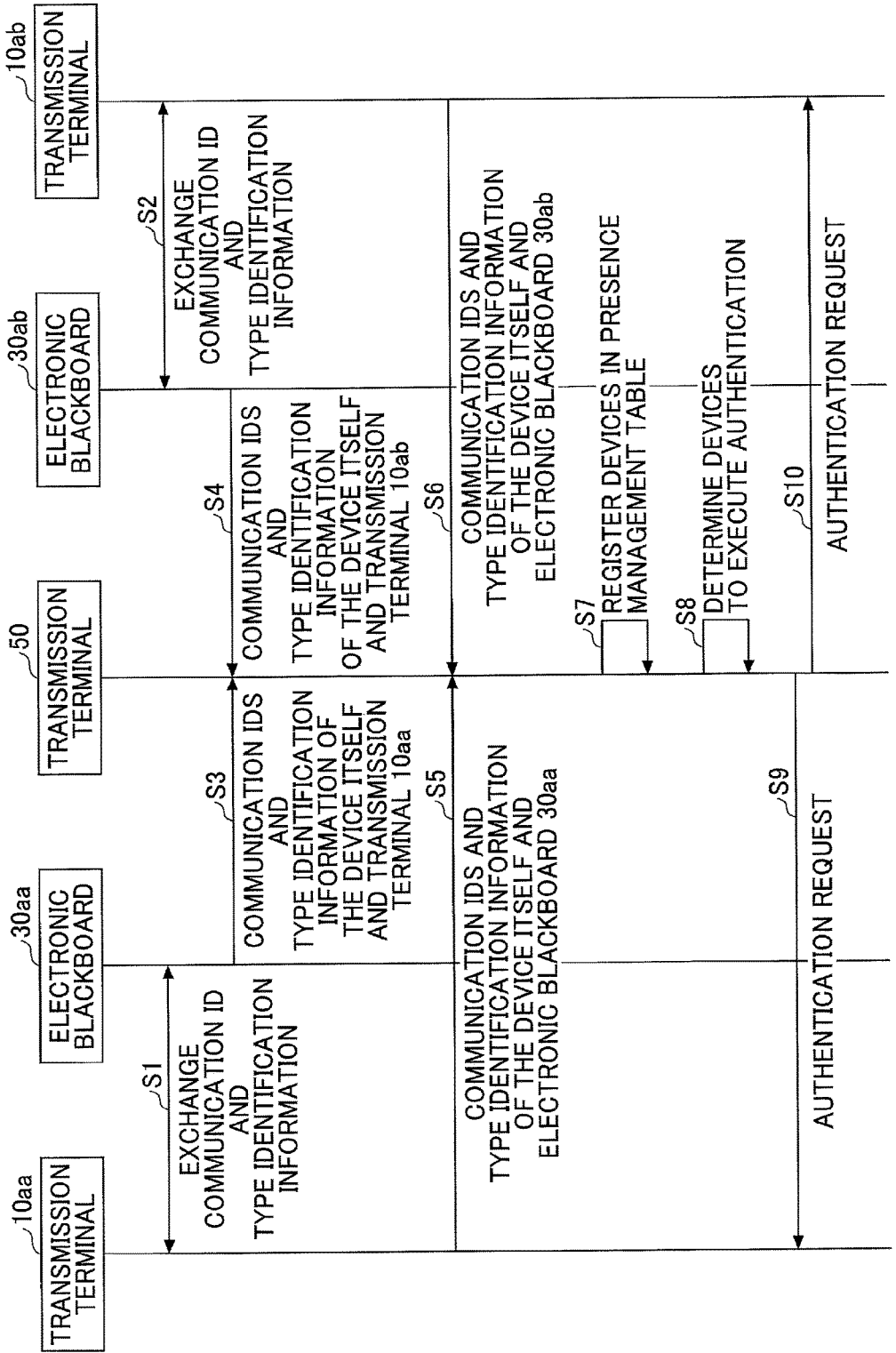
FIG. 16 is an example of a sequence chart that illustrates steps to determine a device to execute authentication, by a transmission management system.

FIG. 16 is an example of a sequence chart that illustrates steps to determine a device to execute authentication, by the transmission management system 50.

S1, 2: The transmission terminal 10aa and the electronic blackboard 30aa exchange the communication IDs. The transmission terminal 10ab and the electronic blackboard 30ab exchange the communication ID and the type identification information. Of course, the communication ID and the type identification information cannot be exchanged with a device that does not exist.

S3, 4: The electronic blackboard 30aa transmits the communications ID and type identification information of the device itself and the transmission terminal 10aa to the transmission management system 50 (an external device). The electronic blackboard 30ab transmits the communication IDs and type identification information of the device itself and the transmission terminal 10ab to the transmission management system 50.

S5, 6: The transmission terminal 10aa transmits the communication IDs and type identification information of the device itself and the electronic blackboard 30aa to the transmission management system 50. The transmission terminal 10ab transmits the communication IDs and type identification information of the device itself and the electronic blackboard 30ab to the transmission management system 50. By Steps S3 to S6, the transmission management system 50 can grasp devices that exist each site because devices at a site transmit the same communication ID unique to the site. Note that one of the transmissions at Steps S3 and S5 may be omitted, and one of the transmissions at Steps S3 and S5 may be omitted in this case. However, all devices transmit the communication ID and the type identification information because the devices at the site may not be known in advance. Alternatively, just one of the devices at a site arbitrated based on the priority may transmit the communication ID and the connection information.

S7: The authentication device determination unit 54 of the transmission management system 50 registers the devices existing at the sites in the presence management table.

S8: The authentication device determination unit 54 of the transmission management system 50 determines a device having the highest priority among devices that commonly exist at the sites in the presence management table, as the device to execute authentication, for each site. Assume here that the transmission terminals 10aa and 10ab are determined as the devices to execute authentication at the respective sites.

S9, 10: The authentication device determination unit 54 of the transmission management system 50 transmits authentication requests to the transmission terminals 10aa and 10ab via the transceiver unit 51.

Thus, as described in the first embodiment, the transmission terminal 10aa receives the connection information and the type identification information from the electronic blackboard 30aa, and has the electronic blackboard 30aa authenticate the electronic blackboard 30ab.

Figure 17:
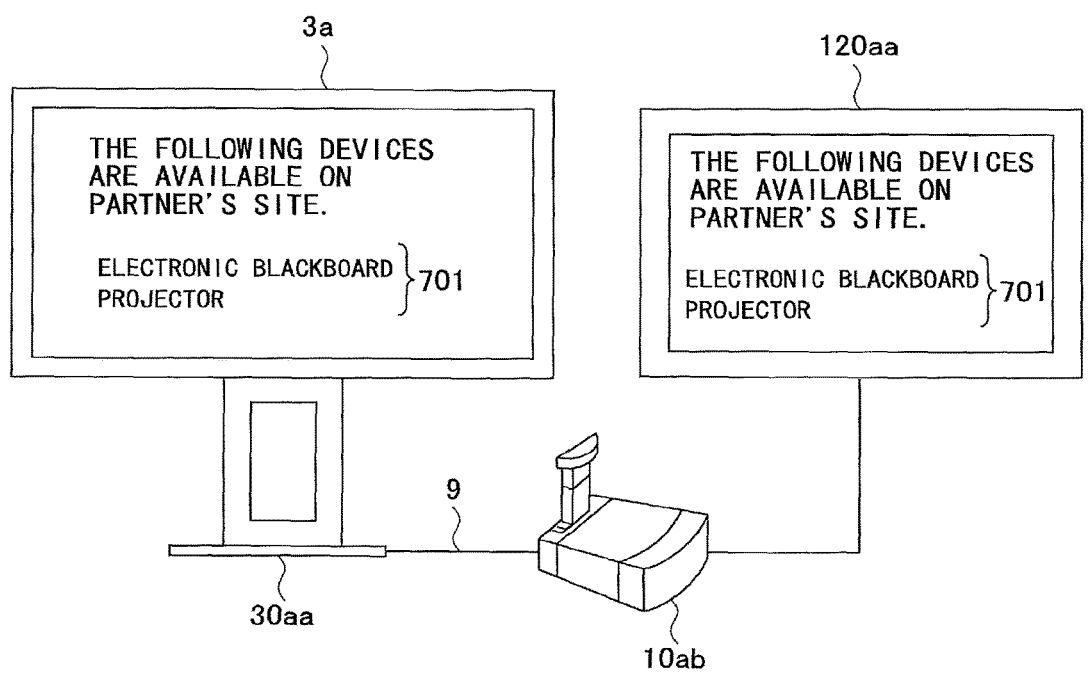
FIG. 17 is an example of a diagram that illustrates a list of devices at a site B that are shown on a display of a transmission terminal.

Note that as illustrated in FIG. 17, at

Steps S9 and S10, the transmission management system 50 may indicate the list of the devices that exist at the partner sites to the transmission terminals 10aa and 10ab, respectively. FIG. 17 is an example of a diagram that illustrates a list 701 of devices at the site B shown on the display 120 of the transmission terminal 10aa. Displaying the list 701 of the devices may be done by the electronic blackboard 30aa as illustrated in FIG. 17.

Also, since the electronic blackboards 30aa and 30ab are authenticated by using the transmission terminal 10aa, a message may be displayed to indicate that authentication of the electronic blackboards 30aa and 30ab by themselves is not required.

Therefore, according to the embodiment, an appropriate device can be selected even if multiple devices exist at sites that can execute authentication via an external network.

Other Application Examples

Most preferable embodiments of the present invention have been described as above. Further, the present invention is not limited to these embodiments, but various variations and modifications may be made without departing from the scope of the present invention.

For example, the functions of the transmission management system 50 may be distributed and installed on multiple servers. Also, multiple transmission management systems 50 may exist. Also, if three or more device (for example, a transmission terminal 10, an electronic blackboard 30, and a projector) exist at one site, the user needs just one authentication operation to use the three devices via a network. For example, the transmission terminal 10aa may transmit the connection information and the type identification information of the electronic blackboard 30 and the projector to the transmission terminal 10ab at the site of the partner. In the embodiments, description assumes that mainly the transmission terminal 10 is authenticated via the first communication network N1. However, if the user uses a mobile terminal 20, the electronic blackboard 30ab can be authenticated by the electronic blackboard 30aa in the same way.

The present application is based on and claims the benefit of priority of Japanese Priority Application No. 2015-

049285, filed on Mar. 12, 2015, with the Japanese Patent Office, the entire contents of which are hereby incorporated by reference.

What is claimed is:

1. A communication system, in which a videoconference can be established between a first device at a first site and a second device at a second site via a network, comprising:
   the first device, including
      a first camera;
      first processing circuitry configured to
         execute authentication with the second device and establish a communication session for the video conference between the first device using the first camera and the second device using a second camera, and start communication with the second device over the network, wherein the video conference is executed using the first and second cameras of the first and second devices, respectively, and
         obtain connection information from a first electronic blackboard at the first site connected with the first device by wire or wirelessly, the connection information being required for a second electronic blackboard at the second site to connect with the first electronic blackboard at the first site over the network, and obtain first type information representing a type of the first electronic blackboard at the first site, and
      a transmitter configured to transmit, after the communication session is established, the obtained connection information and the obtained first type information to the second device by using the established communication session for the video conference; and
   the second device, including
      the second camera;
      a receiver configured to receive the connection information and the first type information transmitted from the first device, and
      second processing circuitry configured to
         obtain the received connection information, the received first type information, and second type information representing a type of the second electronic blackboard at the second site,
         determine whether the received first type information and the obtained second type information are a same type so that communication between the first and second electronic blackboards is possible, and
         when determining that the first and second type information is the same type, transmit the received connection information to the second electronic blackboard at the second site connected with the second device by wire or wirelessly so that the second electronic blackboard can establish a separate connection to the first electronic blackboard via the network by transmitting a request and the connection information to the first electronic blackboard.

2. The communication system as claimed in claim 1, wherein when the second processing circuitry of the second device does not detect the second electronic blackboard at the second site connected by wire or wirelessly, the receiver indicates to the first device that the second electronic blackboard at the second site does not exist.

3. The communication system as claimed in claim 2, wherein in response to receiving the indication from the second device that the second electronic blackboard at the second site does not exist, the first device displays, on a display, an indication that the second electronic blackboard at the second site does not exist.

4. The communication system as claimed in claim 1, wherein the first device displays, on a display, an indication that the connection information is to be transmitted before the transmitter transmits the connection information to the second device.

5. The communication system as claimed in claim 1, wherein when the first processing circuitry transmits identification information of the first device to the first electronic blackboard at the first site, and receives an indication from the first electronic blackboard at the first site that the first device is a device to communicate with the second electronic blackboard at the second site, the transmitter transmits the connection information to the second device.

6. The communication system as claimed in claim 1, wherein the first processing circuitry is configured to exchange identification information with the first electronic blackboard at the first site,
   the first device transmits the identification information of the first device and the first electronic blackboard at the first site to an external device, and the first electronic blackboard at the first site transmits the identification information of the first electronic blackboard at the first site and the first device to the external device,
   the external device determines the first device as a device to transmit the connection information to the second site, depending on devices existing at the first site and the second site, and
   when the first device receives an indication about the determination from the external device, the transmitter transmits the connection information to the second device.

7. The communication system as claimed in claim 6, wherein the first device obtains a list of the devices existing at the second site from the external device, and displays the list on a display.

8. The communication system as claimed in claim 1, further comprising:
   the first electronic blackboard existing at the first site; and
   the second electronic blackboard existing at the second site,
   wherein the second electronic blackboard at the second site includes a connection interface configured to connect with the first electronic blackboard at the first site, by using the connection information transmitted from the second processing circuitry.

9. The communication system as claimed in claim 1, wherein the first device communicates with the first electronic blackboard at the first site via an HDMI cable or Bluetooth (trademark).

10. A transmission terminal at a first site to communicate in a videoconference over a network with a second transmission terminal at a second site, wherein the second transmission terminal at the second site includes
   a second camera;
   a receiver configured to receive connection information and first type information from the transmission terminal at the first site, required for a second electronic blackboard at the second site to connect over the network with a first electronic blackboard at the first site connected with the transmission terminal at the first site by wire or wirelessly, and
   second processing circuitry configured to obtain the received connection information, the received first type information, and second type information representing a type of the second electronic blackboard at the second site, determine whether the received first type information and the obtained second type information are a same type so that communication between the first and second electronic blackboards is possible, and when determining that the first and second type information is the same type, transmit the received connection information to the second electronic blackboard at the second site connected with the second transmission terminal at the second site by wire or wirelessly so that the second electronic blackboard can establish a separate connection to the first electronic blackboard via the network by transmitting a request and the connection information to the first electronic blackboard, the transmission terminal at the first site, comprising:
   a first camera;
   first processing circuitry configured to
      execute authentication with the second transmission terminal and establish a communication session for the video conference between the transmission terminal using the first camera and the second transmission terminal using the second camera, and start communication with the second transmission terminal at the second site over the network, wherein the video conference is executed using the first and second cameras of the first and second transmission terminals, respectively; and
      obtain the connection information from the first electronic blackboard at the first site connected with the transmission terminal at the first site by wire or wirelessly; and
   a transmitter configured to transmit, after the communication session is established, the obtained connection information and the first type information to the second transmission terminal.

11. A method of communication executed by an information processing apparatus including a first camera at a first site to communicate in a videoconference over a network with a second transmission terminal at a second site, wherein the second transmission terminal at the second site includes
   a second camera;
   a receiver configured to receive connection information and first type information from the information processing apparatus at the first site, required for a second electronic blackboard at the second site to connect over the network with a first electronic blackboard at the first site connected with the information processing apparatus at the first site by wire or wirelessly, and processing circuitry configured to obtain the received connection information, the received first type information, and second type information representing a type of the second electronic blackboard at the second site, determine whether the received first type information and the obtained second type information are a same type so that communication between the first and second electronic blackboards is possible, and when determining that the first and second type information is the same type, transmit the received connection information to the second electronic blackboard at the second site connected with the second transmission terminal at the second site by wire or wirelessly so that the second electronic blackboard can establish a separate connection to the first electronic blackboard via the network by transmitting a request and the connection information to the first electronic blackboard, the method comprising:
   executing authentication with the second transmission terminal and establish a communication session for the video conference between the information processing apparatus using the first camera and the second transmission terminal using the second camera, and start communication with the second transmission terminal at the second site over the network, wherein the video conference is executed using the first and second cameras of the information processing apparatus and the second transmission terminal, respectively;
   obtaining the connection information from the first electronic blackboard at the first site connected with the information processing apparatus at the first site by wire or wirelessly; and
   transmitting, after the communication session is established, the obtained connection information and the first type information to the second transmission terminal.

12. The communication system of claim 1, wherein the transmitter of the first device is configured to transmit an address of the first electronic blackboard to the second device, the address being at least a part of the connection information.

13. The communication system of claim 1, wherein the transmitter of the first device is configured to transmit a password of the first electronic blackboard to the second device, the password being at least a part of the connection information.

* * * * *